US008045025B2

(12) United States Patent
Yanai et al.

(10) Patent No.: US 8,045,025 B2
(45) Date of Patent: Oct. 25, 2011

(54) IMAGE PICKUP DEVICE ADAPTABLE TO DISPLAY FEWER VERTICAL PIXELS

(75) Inventors: Toshikazu Yanai, Kawasaki (JP); Yuji Sakaegi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1674 days.

(21) Appl. No.: 08/994,642

(22) Filed: Dec. 19, 1997

(65) Prior Publication Data

US 2002/0057354 A1 May 16, 2002

(30) Foreign Application Priority Data

Dec. 20, 1996 (JP) ........................................ 8-341753

(51) Int. Cl.
*H04N 3/14* (2006.01)
(52) U.S. Cl. ........................................................ 348/279
(58) Field of Classification Search .................. 348/279, 348/278, 277, 275, 273, 272, 282; 257/440; 358/513
See application file for complete search history.

(56) References Cited

U.S. PATENT DOCUMENTS

| 4,768,084 | A | * | 8/1988 | Noda et al. ........................ 358/44 |
| 5,726,707 | A | * | 3/1998 | Sakurai et al. .................. 348/279 |
| 5,737,017 | A | * | 4/1998 | Udagawa et al. ............... 348/280 |
| 5,825,511 | A | | 10/1998 | Hori et al. ....................... 358/486 |
| 5,872,596 | A | | 2/1999 | Yanai et al. ..................... 348/297 |
| 5,880,781 | A | * | 3/1999 | Udagawa et al. ............... 348/279 |
| 5,907,355 | A | * | 5/1999 | Kotaki ............................ 348/373 |

FOREIGN PATENT DOCUMENTS

JP 09-46715 2/1997

OTHER PUBLICATIONS

Tanaka et al., HDTV Single-Chip CCD Color Camera, Jun. 1990, IEEE.*
Tanaka et al.: HDTV Single-Chip CCD Color Camera, 1990 IEEE.*
Definition of "color-difference singal", The IEEE Standard Dictionary of Electrical and Electronics Terms, Sixth Edition, 1997, p. 175.*

* cited by examiner

*Primary Examiner* — Timothy J Henn
(74) *Attorney, Agent, or Firm* — Fitzpatrick, Cella, Harper & Scinto

(57) ABSTRACT

In an image pickup device, in order to enable signal charge read-out from the image pickup element in a thinning-out manner from the pixels of predetermined rows, even in case the image display unit has a number of pixels in the vertical direction smaller than the number of pixels that can be outputted from the image pickup element in a single image pickup operation, and also to form a color image even from the thinned-out image signal from the image pickup element, the signal charges are read in thinning-out manner from the pixels of predetermined rows, then there is formed a line-sequential color difference signal consisting of a signal S(odd) in which color signals (Ye+Mg) and (Cy+G) are repeated in this order and a signal S(even) in which color signals (Ye+G) and (Cy+Mg) are repeated in this order and an image signal corresponding to a row in every four rows in the vertical direction is outputted from the image pickup element.

9 Claims, 36 Drawing Sheets

| | First Column | Second Column | Third Column | Fourth Column |
|---|---|---|---|---|
| TENTH ROW | Mg | G | Mg | G |
| NINTH ROW | Ye | Cy | Ye | Cy |
| EIGHTH ROW | G | Mg | G | Mg |
| SEVENTH ROW | Ye | Cy | Ye | Cy |
| SIXTH ROW | Mg | G | Mg | G |
| FIFTH ROW | Cy | Ye | Cy | Ye |
| FOURTH ROW | G | Mg | G | Mg |
| THIRD ROW | Cy | Ye | Cy | Ye |
| SECOND ROW | Mg | G | Mg | G |
| FIRST ROW | Ye | Cy | Ye | Cy |

FIG. 3

| | First Column | Second Column | Third Column | Fourth Column | |
|---|---|---|---|---|---|
| Tenth Row | Mg | G | Mg | G | |
| Ninth Row | Ye | Cy | Ye | Cy | |
| Eighth Row | G | Mg | G | Mg | |
| Seventh Row | Ye | Cy | Ye | Cy | |
| Sixth Row | Mg | G | Mg | G | |
| Fifth Row | Cy | Ye | Cy | Ye | |
| Fourth Row | G | Mg | G | Mg | |
| Third Row | Cy | Ye | Cy | Ye | |
| Second Row | Mg | G | Mg | G | |
| First Row | Ye | Cy | Ye | Cy | |

FIG. 26

| | First Column | Second Column | Third Column | Fourth Column |
|---|---|---|---|---|
| TENTH ROW | Mg | G | Mg | G |
| NINTH ROW | Ye | Cy | Ye | Cy |
| EIGHTH ROW | Mg | G | Mg | G |
| SEVENTH ROW | Cy | Ye | Cy | Ye |
| SIXTH ROW | G | Mg | G | Mg |
| FIFTH ROW | Ye | Cy | Ye | Cy |
| FOURTH ROW | G | Mg | G | Mg |
| THIRD ROW | Cy | Ye | Cy | Ye |
| SECOND ROW | Mg | G | Mg | G |
| FIRST ROW | Ye | Cy | Ye | Cy |

FIG. 27

| | First Column | Second Column | Third Column | Fourth Column |
|---|---|---|---|---|
| Tenth Row | G | Mg | G | Mg |
| Ninth Row | Ye | Cy | Ye | Cy |
| Eighth Row | Mg | G | Mg | G |
| Seventh Row | Cy | Ye | Cy | Ye |
| Sixth Row | G | Mg | G | Mg |
| Fifth Row | Ye | Cy | Ye | Cy |
| Fourth Row | Mg | G | Mg | G |
| Third Row | Cy | Ye | Cy | Ye |
| Second Row | G | Mg | G | Mg |
| First Row | Ye | Cy | Ye | Cy |

FIG. 28

| | First Column | Second Column | Third Column | Fourth Column |
|---|---|---|---|---|
| Tenth Row | Mg | G | Mg | G |
| Ninth Row | Ye | Cy | Ye | Cy |
| Eighth Row | Mg | G | Mg | G |
| Seventh Row | Ye | Cy | Ye | Cy |
| Sixth Row | G | Mg | G | Mg |
| Fifth Row | Cy | Ye | Cy | Ye |
| Fourth Row | G | Mg | G | Mg |
| Third Row | Cy | Ye | Cy | Ye |
| Second Row | Mg | G | Mg | G |
| First Row | Ye | Cy | Ye | Cy |

FIG. 29

| | First Column | Second Column | Third Column | Fourth Column |
|---|---|---|---|---|
| Tenth Row | Mg | G | Mg | G |
| Ninth Row | Ye | Cy | Ye | Cy |
| Eighth Row | G | Mg | G | Mg |
| Seventh Row | Cy | Ye | Cy | Ye |
| Sixth Row | Mg | G | Mg | G |
| Fifth Row | Ye | Cy | Ye | Cy |
| Fourth Row | G | Mg | G | Mg |
| Third Row | Cy | Ye | Cy | Ye |
| Second Row | Mg | G | Mg | G |
| First Row | Ye | Cy | Ye | Cy |

FIG. 31

| | First Column | Second Column | Third Column | Fourth Column |
|---|---|---|---|---|
| TENTH ROW | Mg | G | Mg | G |
| NINTH ROW | Ye | Cy | Ye | Cy |
| EIGHTH ROW | G | Mg | G | Mg |
| SEVENTH ROW | Cy | Ye | Cy | Ye |
| SIXTH ROW | Mg | G | Mg | G |
| FIFTH ROW | Ye | Cy | Ye | Cy |
| FOURTH ROW | Mg | G | Mg | G |
| THIRD ROW | Ye | Cy | Ye | Cy |
| SECOND ROW | Mg | G | Mg | G |
| FIRST ROW | Ye | Cy | Ye | Cy |

FIG. 32

| | First Column | Second Column | Third Column | Fourth Column |
|---|---|---|---|---|
| Tenth Row | Mg | G | Mg | G |
| Ninth Row | Ye | Cy | Ye | Cy |
| Eighth Row | Mg | G | Mg | G |
| Seventh Row | Cy | Ye | Cy | Ye |
| Sixth Row | G | Mg | G | Mg |
| Fifth Row | Ye | Cy | Ye | Cy |
| Fourth Row | Mg | G | Mg | G |
| Third Row | Ye | Cy | Ye | Cy |
| Second Row | Mg | G | Mg | G |
| First Row | Ye | Cy | Ye | Cy |

FIG. 33

| | FIRST COLUMN | SECOND COLUMN | THIRD COLUMN | FOURTH COLUMN |
|---:|:---:|:---:|:---:|:---:|
| TENTH ROW | Mg | G | Mg | G |
| NINTH ROW | Ye | Cy | Ye | Cy |
| EIGHTH ROW | G | Mg | G | Mg |
| SEVENTH ROW | Ye | Cy | Ye | Cy |
| SIXTH ROW | Mg | G | Mg | G |
| FIFTH ROW | Cy | Ye | Cy | Ye |
| FOURTH ROW | Mg | G | Mg | G |
| THIRD ROW | Ye | Cy | Ye | Cy |
| SECOND ROW | Mg | G | Mg | G |
| FIRST ROW | Ye | Cy | Ye | Cy |

FIG. 34

| | First Column | Second Column | Third Column | Fourth Column |
|---|---|---|---|---|
| TENTH ROW | G | Mg | G | Mg |
| NINTH ROW | Ye | Cy | Ye | Cy |
| EIGHTH ROW | Mg | G | Mg | G |
| SEVENTH ROW | Ye | Cy | Ye | Cy |
| SIXTH ROW | G | Mg | G | Mg |
| FIFTH ROW | Cy | Ye | Cy | Ye |
| FOURTH ROW | G | Mg | G | Mg |
| THIRD ROW | Ye | Cy | Ye | Cy |
| SECOND ROW | G | Mg | G | Mg |
| FIRST ROW | Ye | Cy | Ye | Cy |

FIG. 35

| | First Column | Second Column | Third Column | Fourth Column |
|---|---|---|---|---|
| Tenth Row | Mg | G | Mg | G |
| Ninth Row | Cy | Ye | Cy | Ye |
| Eighth Row | Mg | G | Mg | G |
| Seventh Row | Ye | Cy | Ye | Cy |
| Sixth Row | G | Mg | G | Mg |
| Fifth Row | Cy | Ye | Cy | Ye |
| Fourth Row | Mg | G | Mg | G |
| Third Row | Cy | Ye | Cy | Ye |
| Second Row | Mg | G | Mg | G |
| First Row | Cy | Ye | Cy | Ye |

FIG. 36

| | First Column | Second Column | Third Column | Fourth Column |
|---|---|---|---|---|
| Tenth Row | G | Mg | G | Mg |
| Ninth Row | Ye | Cy | Ye | Cy |
| Eighth Row | Mg | G | Mg | G |
| Seventh Row | Cy | Ye | Cy | Ye |
| Sixth Row | G | Mg | G | Mg |
| Fifth Row | Ye | Cy | Ye | Cy |
| Fourth Row | G | Mg | G | Mg |
| Third Row | Ye | Cy | Ye | Cy |
| Second Row | G | Mg | G | Mg |
| First Row | Ye | Cy | Ye | Cy |

IMAGE PICKUP DEVICE ADAPTABLE TO DISPLAY FEWER VERTICAL PIXELS

BACKGROUND OF THE INVENTION

1. Field of the Invention

The present invention relates to an image pickup device equipped with an image pickup element such as a CCD (charge coupled device) of an interline structure with a function of reading all the pixels.

2. Related Background Art

The image pickup device of a large pixel number, suitable for use in an electronic still camera of a high resolution or the like, is generally represented by a CCD image sensor of interline structure. Such CCD image sensor is provided, as shown in FIG. 37, with photoelectric converting elements (pixels) 101 arranged in a matrix and adapted to convert the incident light into electric charges; vertical charge transfer units (VCCD) 102 for reading the charges accumulated in such pixels 101 and transferring the charges in the vertical direction; a horizontal charge transfer unit (HCCD) 103 for transferring the signal charges, transferred from the VCCD's 102, in the horizontal direction; and an output unit 104 for outputting the transferred signal charges as an image signal from an output terminal 105.

Such interline CCD image sensor functions in the following manner. At first, the signal charges accumulated in the pixels 101 by photoelectric conversion are transferred to the VCCD's 102, and then transferred in succession to the HCCD 103, in case of the illustrated 4-phase drive, by driving pulses φV1, φV2, φV3 and φV4. Then, in the HCCD 103, the signal charges of a horizontal row, transferred from the VCCD's 102, are transferred in succession to the output unit 104, in case of the illustrate 2-phase drive, by driving pulses φH1 and φH2. The signal charges transferred to the output unit 104 are converted into an image signal (voltage) and outputted from the output terminal 105.

FIG. 38 is a block diagram in case the above-explained CCD image sensor is applied to an image pickup device provided with the exposure control function. The image pickup device is composed of a lens and a diaphragm therefor (not shown); an image pickup element 111 consisting of the above-explained interline CCD image sensor; a drive circuit 112 for the diaphragm and the image pickup element 111; a signal processing circuit 113 for applying a necessary process to the image signal; an image memory 114 for temporarily storing the image signal of all the pixels outputted by an image taking operation of the image pickup element 111; an image display unit 115 composed of an electronic view finder or a liquid crystal display for displaying an image constructed from the image signal; and a synchronization control circuit 116 for controlling the entire image pickup device.

In the following there will be explained the function of the image pickup element of the above-explained configuration. At first the light, adjusted to an adequate light amount by the diaphragm, enters the image pickup element 111 and is photoelectrically converted into an output image signal in the image pickup element 111 by the function of the drive circuit 112 under the control of the control circuit 116. Then the level of the image signal is controlled under the control of the synchronization control circuit 116 according to the signal level of the image signal, or the diaphragm is adjusted by the drive circuit 112. Subsequently the image signal is subjected to a necessary processing in the signal process circuit 113 and is stored in the image memory 114. Then the image display unit 115 constructs and displays an image according to such image signal.

In case the image display unit 115 has a number of pixels in the vertical direction, smaller than the number of pixels that can be outputted from the image pickup element 111 in a single photographing operation, the display can be achieved by storing the image signal outputted from the image pickup element 111 in a single image taking operation in the image memory 114 and outputting such image signal to the image display unit 115 after thinning-out the pixel rows to a pixel number in the vertical direction same as that of the image display unit 115, or thinning-out the image signal, obtained by a single image taking operation of the image pickup element 111, by means of the image process unit 113 to a pixel number in the vertical direction same as that of the image display unit 115, then storing the thinned-out image signal in the image memory 114 and outputting such image signal to the image display unit 115.

However, in such conventional image pickup device, if the image pickup element is combined with an image display unit of which the number of pixels in the vertical direction is less than that outputted from the image pickup element in a single image taking operation, the image pickup element is always required to output the image signal of all the pixels that can be in a single image taking operation, so that there is not only required a long time for each image taking operation but, in case of displaying the images in succession for image recording into and reading from the image memory the renewal of the image takes a long time so that it becomes difficult to determine the image configuration.

Also, since the number of pixels in the vertical direction is different between the image pickup element and the image display unit, there are required an image memory and vertical thinning-out means for achieving the synchronization with the image display unit, whereby the circuit configuration becomes complicated and the production cost increases significantly.

SUMMARY OF THE INVENTION

In consideration of the foregoing, an object of the present invention is to provide an image pickup device capable of reading the signal charges from the pixels of predetermined rows of the image pickup element in case of employing an image display unit of which the number of pixels in the vertical direction is less than the number of pixels which can be outputted from the image pickup element in a single image taking operation, also capable of forming a color image from the thinned-out image signal from the image pickup element, thereby dispensing with special means such as an image memory or vertical thinning-out means for achieving synchronization between the image pickup element and the image display unit and achieving simplification of the circuit configuration and reduction of the magnitude of circuitry.

Another object of the present invention is to provide an image pickup device capable of reading the signal charges by adding those from the pixels of predetermined rows of the image pickup element in case of employing an image display unit of which the number of pixels in the vertical direction is less than the number of pixels which can be outputted from the image pickup element in a single image pickup operation, also capable of forming a color image from the image signal after addition from the image pickup element, thereby enabling satisfactory image display in the image pickup operation in a dark situation.

The image pickup device of the present invention is to provide with a color filter array in which filters of different colors are arranged in the horizontal and vertical directions, and an image pickup element for picking up the image of an object through such color filter array, wherein the color filter array is composed of an array of color filter groups of plural units in which each unit is composed of first to eighth color filter groups and each color filter group representing a column is composed of an array of the above-mentioned color filters, the first color filter group being composed of an alternate array of first and second color filters, the second color filter group being composed of an alternate array of third and fourth color filters, the third color filter group being composed of an alternate array of the second and first color filters, the fourth color filter group being composed of an alternate array of the fourth and third color filters, the fifth color filter group being composed in the same manner as the third color filter group, the sixth color filter group being composed in the same manner as the second color filter group, the seventh color filter group being composed in the same manner as the first color filter group, and the eighth color filter group being composed in the same manner as the fourth color filter group.

In an embodiment of the image pickup device of the present invention, the above-mentioned first to fourth color filters are of yellow, cyan, magenta and green colors.

Also the image pickup device of the present invention comprises an image pickup element for picking up an image of an object, wherein the image pickup element comprises a color filter array in which filters of different colors are arranged in the horizontal and vertical directions and through which the image of the object is picked up by said image pickup element, plural pixels constituting photoelectric converting elements arranged in the horizontal and vertical directions corresponding to the color filters, plural vertical charge transfer units provided respectively for the vertical columns of the pixels and serving to transfer the charges from the pixels in the vertical direction, a horizontal charge transfer unit connected to ends of the vertical charge transfer units and horizontally transferring the charges transferred from the vertical charge transfer units, and an output unit for converting the signal charges transferred from the horizontal charge transfer unit into an image signal and outputting such image signal, wherein the color filter array is composed of an array in the vertical direction of color filter groups of plural units in which each unit is composed of 8 columns and each odd-numbered column is composed of an alternate array of first and second color filters in a predetermined order while each even-numbered column is composed of an alternate array of third and fourth color filters in a predetermined order, and, among the image signal obtained by the image pickup element in a single image pickup operation, the image signal corresponding to a row for four vertical columns is output as a line-sequential color difference signal from the output unit.

In an embodiment of the image pickup device of the present invention, the color filter array is constructed so that the color filter of a (4n+1)th row and an odd-numbered column is same as that of a (4n+3)th row and an even-numbered column, that the color filter of a (4n+2)th row and an odd-numbered column is same as that of a (4n+4)th row and an even-numbered column, that the color filter of (4n+1)th row and an even-numbered column is same as that of a (4n+3)th row and an odd-numbered column, and that the color filter of (4n+2)th row and an even-numbered column is same as that of a (4n+4)th row and an odd-numbered column, wherein n is an integer equal to or larger than 0.

In an embodiment of the image pickup device of the present invention, the signal charges of predetermined two pixels adjacent in the vertical direction, among the pixels arranged corresponding to the color filters, are mutually added, and an image signal corresponding to such added signal charges is outputted from the output unit.

In an embodiment of the image pickup device of the present invention, the added signal charges of the above-mentioned predetermined two pixels are further added with signal charges of predetermined two pixels present diagonally to the first-mentioned two pixels in a column adjacent to the column of the first-mentioned two pixels, whereby an image signal corresponding to such signal charges of four pixels is outputted from the output unit.

In an embodiment of the image pickup device of the present invention, by combining a method of adding the signal charges in the vertical and diagonal directions and a method of further adding a signal charge in the vertical direction to the signal charges added in the vertical direction in the above-mentioned manner, an image signal corresponding to such added signal charges is outputted from the output unit.

In an embodiment of the image pickup device of the present invention, the color filters corresponding to the above-mentioned predetermined two color filters are a combination of cyan and green and a combination of yellow and magenta, or a combination of yellow and green and a combination of cyan and magenta.

In an embodiment of the image pickup device of the present invention, the image pickup element is provided with an electrode connected commonly to every fourth pixels for controlling the readout of the signal charges from the pixels to the vertical charge transfer units and also controlling the transfer of the signal charges from the vertical charge transfer units to the horizontal charge transfer unit.

Still other objects of the present invention, and the features thereof, will become fully apparent from the following description which is to be taken in conjunction with the appended drawings.

BRIEF DESCRIPTION OF THE DRAWINGS

FIG. 3 is a schematic view of a color filter array constituting the image pickup device of the first embodiment of the present invention;

FIGS. 14, 15, 16, 17, 18, 19, 20, 21, 22, 23, 24, 25 and 26 are schematic views showing the readout operation utilizing the image pickup device of the second embodiment of the present invention;

FIGS. 27, 28, 29 and 30 are schematic views showing the readout operation utilizing the image pickup device of a variation 1 of the second embodiment of the present invention;

FIGS. 31, 32, 33, 34, 35 and 36 are schematic views showing the readout operation utilizing the image pickup device of a variation 2 of the second embodiment of the present invention;

DESCRIPTION OF THE PREFERRED EMBODIMENTS

Now the present invention will be clarified in detail by preferred embodiments thereof, with reference to the appended drawings.

Figure 1:
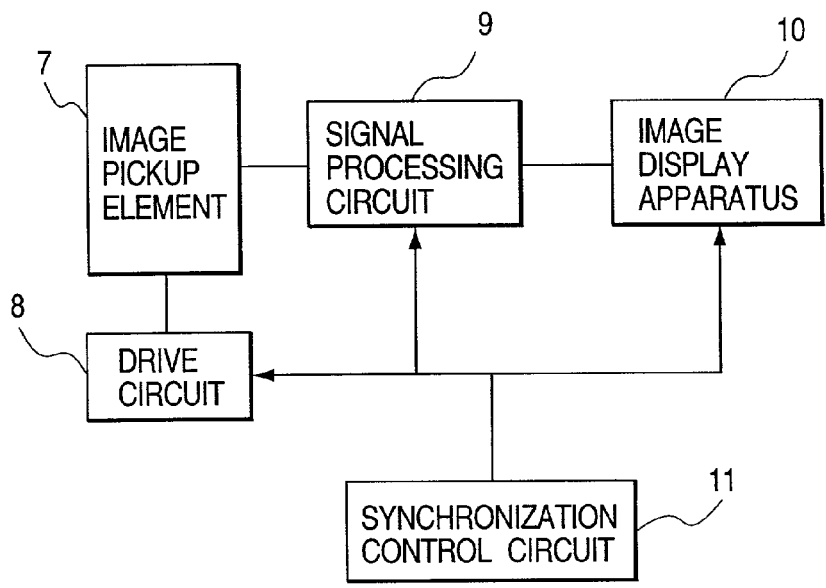
FIG. 1 is a block diagram of a first embodiment of the image pickup device of the present invention.

At first there will be explained a first embodiment, in which the image pickup device is composed, as shown in FIG. 1, of a color filter array of color filters arranged in the horizontal and vertical directions, an unrepresented lens, an image pickup element 7 composed of an interline CCD image sensor, a drive circuit 8 therefor, a signal process circuit 9 for applying necessary processes to the image signal from the image pickup element 7, an image display unit 10 composed for example of an electronic view finder or a liquid crystal display for displaying an image constructed from the image signal, and a synchronization control circuit 11 for controlling the entire image pickup device. The image display unit 10 has a number of pixels in the vertical direction, smaller than the number of pixels that can be outputted from the image pickup element 7 in a single image pickup operation.

Figure 2:
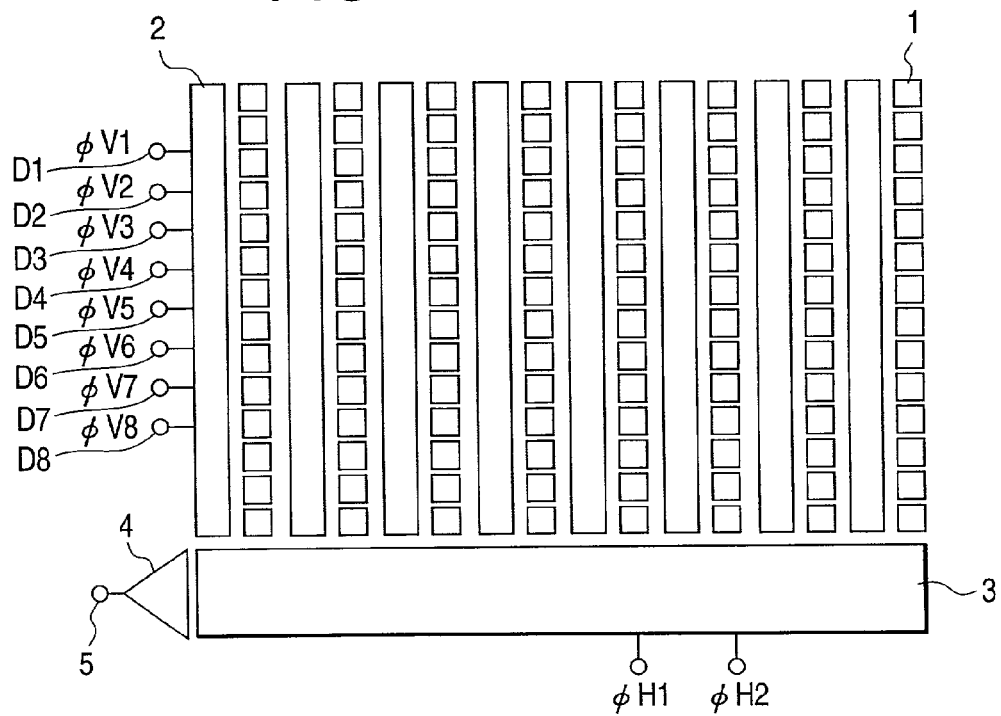
FIG. 2 is a schematic view of an image pickup element constituting the image pickup device of the first embodiment of the present invention.

The image pickup element 7 is composed, as shown in FIG. 2, of photoelectric converting elements (pixels) 1 arranged in a matrix and adapted to convert the incident light into electric charges; vertical charge transfer units (VCCD) 2 for reading the charges accumulated in such pixels 1 and transferring the charges in the vertical direction; a horizontal charge transfer unit (HCCD) 3 for transferring the signal charges, transferred from the VCCD's 2, in the horizontal direction; and an output unit 4 for outputting the transferred signal charges as an image signal from an output terminal 5.

The image pickup element 7 is of so-called 8-phase drive type, so that each VCCD 2 is provided with transfer electrodes D1, D2, D3, D4, D5, D6, D7 and D8 and each pixel 1 is connected to two of these electrodes. More specifically, the electrodes D1 and D2 are connected to a pixel 1, the electrodes D3 and D4 are connected to a pixel 1 adjacent to the above-mentioned pixel 1, the electrodes D5 and D6 are connected to a next adjacent pixel 1 and the electrodes D7 and D8 are connected to a further next adjacent pixel 1. These pixels 1 constitute a set and such sets are repeatedly arranged in the vertical direction along the VCCD 2.

Among these electrodes D1 to D8, those D1, D3, D5 and D7 function also as read-out electrodes. The electrodes D1, D3, D5 and D7 are commonly connected to the repeatedly arranged sets of the pixels 1, so that each of the electrodes D1, D3, D5 and D7 is connected commonly to every fourth pixels 1. In such configuration, the number of pixels of the image display unit 10 in the vertical direction need only to be at least ¼ of the number of pixels of the image pickup element 7 in the vertical direction.

At the charge reading operation, signals φV1, φV3, φV5 and φV7 are respectively applied to the electrodes D1, D3, D5 and D7 whereby the signal charges obtained by photoelectric conversion in the pixels 1 are read into the VCCD 2. Also at the charge transfer operation, drive pulses φV1, φV2, φV3, φV4, φV5, φV6, φV7 and φV8 are respectively applied to the electrodes D1 to D8 whereby the signal charges obtained by photoelectric conversion in the pixels 1 are transferred in succession from the VCCD 2 to the HCCD 3. The signal charges of a horizontal row, read in the above-explained manner and transferred to the HCCD 3, are transferred therein in succession to the output unit 4 by drive pulses φH1 and φH2 in case of the illustrated 2-phase drive, and are converted in the output unit 4 into an image signal (voltage) which is outputted from the output terminal 5.

The color filter array is composed of a matrix arrangement of color filters as shown in FIG. 3. There is illustrated a case wherein the color filter array is composed of plural first to fourth color filters, in which the first color filter is yellow (Ye), the second color filter is cyan (Cy), the third color filter is magenta (Mg) and the fourth color filter is green (G). More specifically, the color filter at a (4n+1)th row and an odd-numbered column is same as that at a (4n+3)th row and an even-numbered column and both color filters are Ye or Cy; the color filter at a (4n+2)th row and an odd-numbered column is same as that at a (4n+4)th row and an even-numbered column and both color filters are Mg; the color filter at a (4n+1)th row and an even-numbered column is same as that at a (4n+3)th row and an odd-numbered column and both color filters are Ye or Cy; and the color filter at a (4n+2)th row and an even-numbered column is same as that at a (4n+4)th row and an odd-numbered column and both color filters are G.

Figure 4:
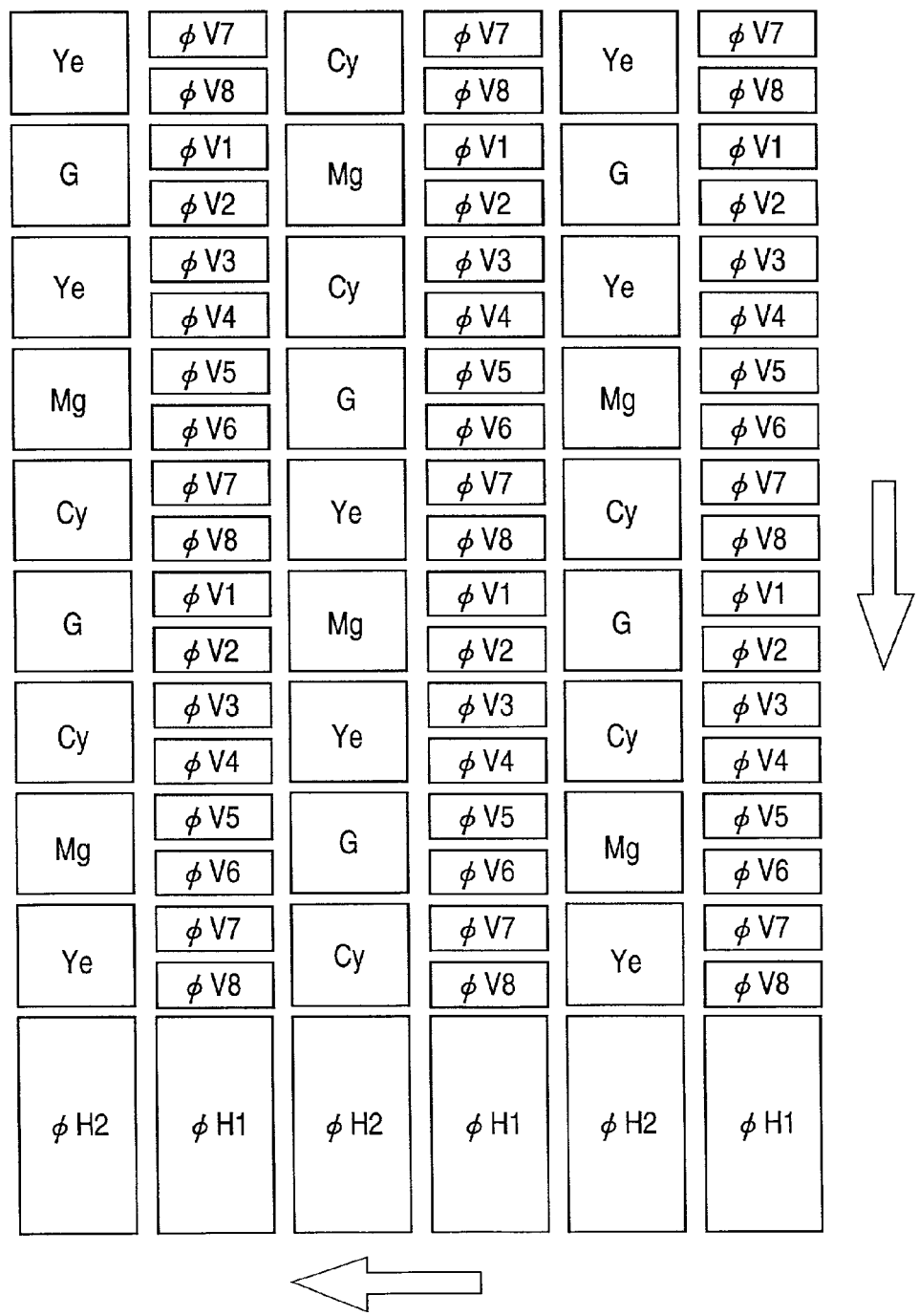
FIG. 4 is a schematic view showing the mode of combination of the color filter array with the image pickup element.

FIG. 4 schematically shows the arrangement of the color filters in combination with the pixels 1 of the image pickup element 7, wherein the VCCD's 2 are only represented by the electrodes D1 to D8 thereof receiving the drive pulses φV1 to φV8 while the HCCD 3 is only represented by the electrodes thereof receiving the drive pulses φH1, φH2. The VCCD's 2 are assumed to execute the charge transfer operation downwards while the HCCD 3 is assumed to execute the charge transfer operation leftward.

In the following there will be explained, with reference to FIGS. 5 to 13, the function of the image pickup device of the above-explained configuration of reading the signal charges accumulated in the pixels 1 respectively corresponding to the color filters and outputting the corresponding image signal. The present first embodiment is capable of thinning-out the signal charges from the pixels 1 of predetermined rows, thereby outputting the charges of a row in every 4 rows in the vertical directions as the image signal.

Figure 5:
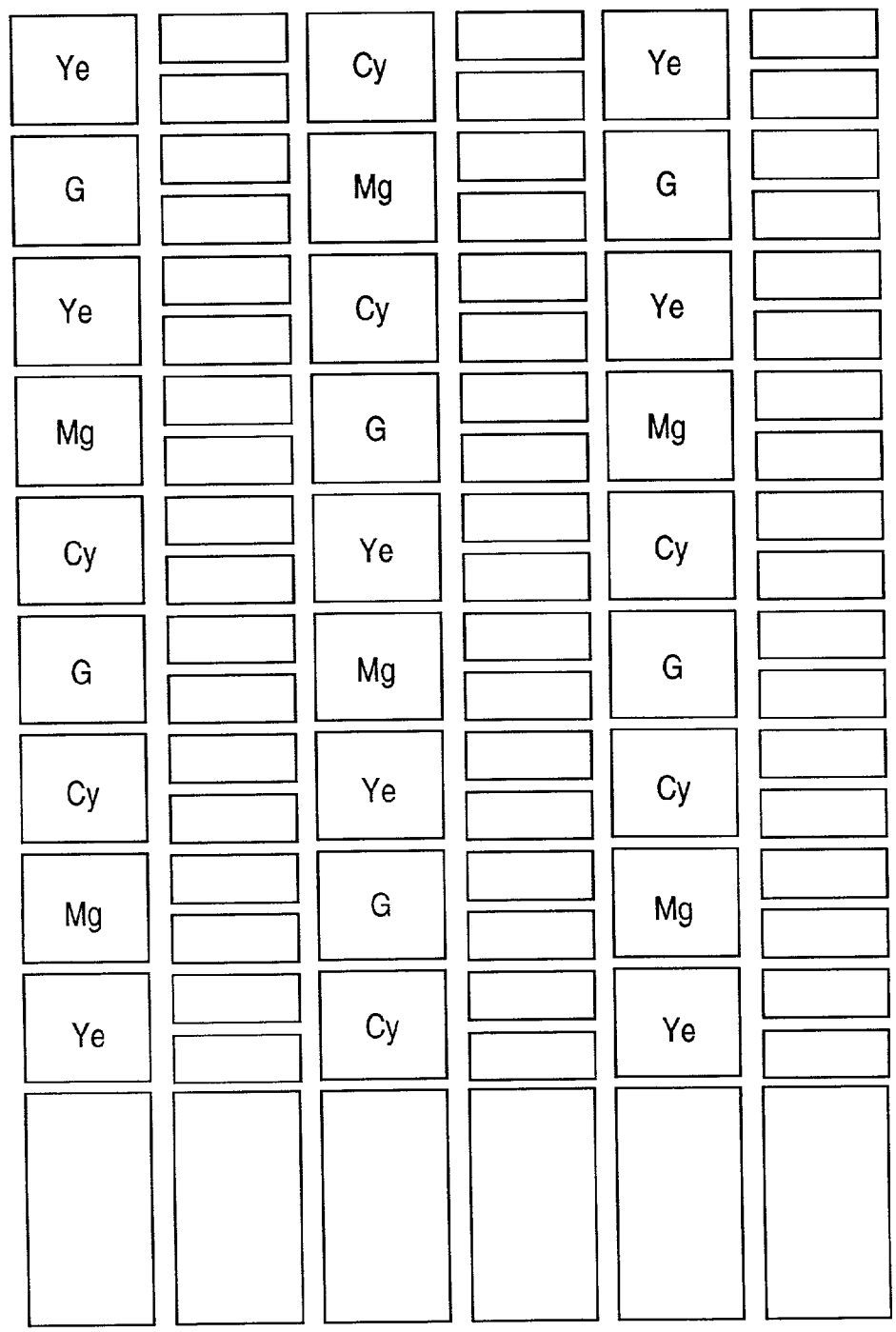
FIGS. 5, 6, 7, 8, 9, 10, 11, 12 and 13 are schematic views showing the readout operation utilizing the image pickup device of the first embodiment of the present invention.

The read-out operation is started from a state in which signal charges respectively corresponding to the color filters are accumulated in the pixels 1, as shown in FIG. 5.

Figure 6:
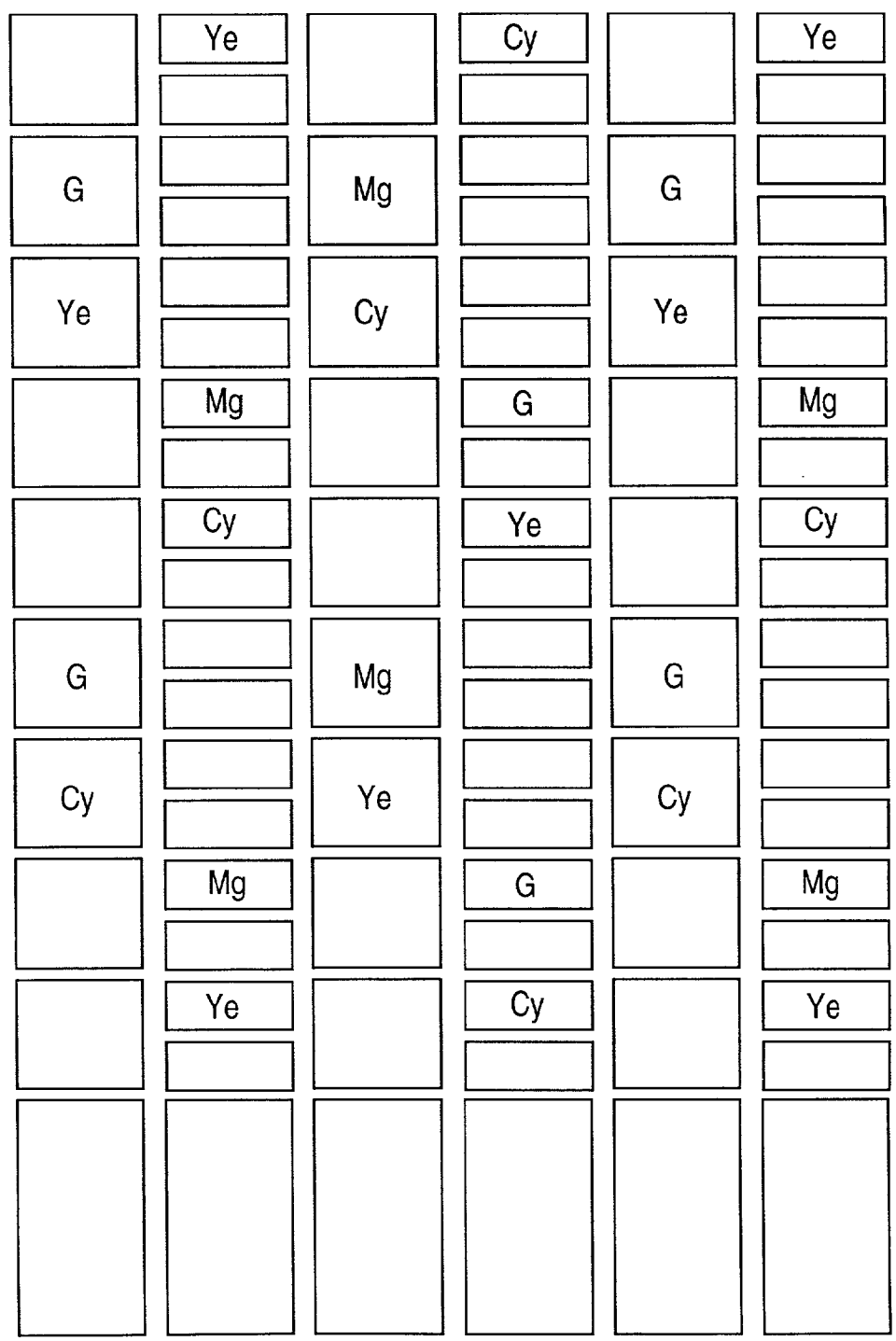

At first, within the VCCD 2, the electrodes D7, D5 are respectively given the drive pulses φV7 and φV5 as shown in FIG. 6 to read the signal charges of the (4n+1)th and (4n+2)th rows.

Figure 7:
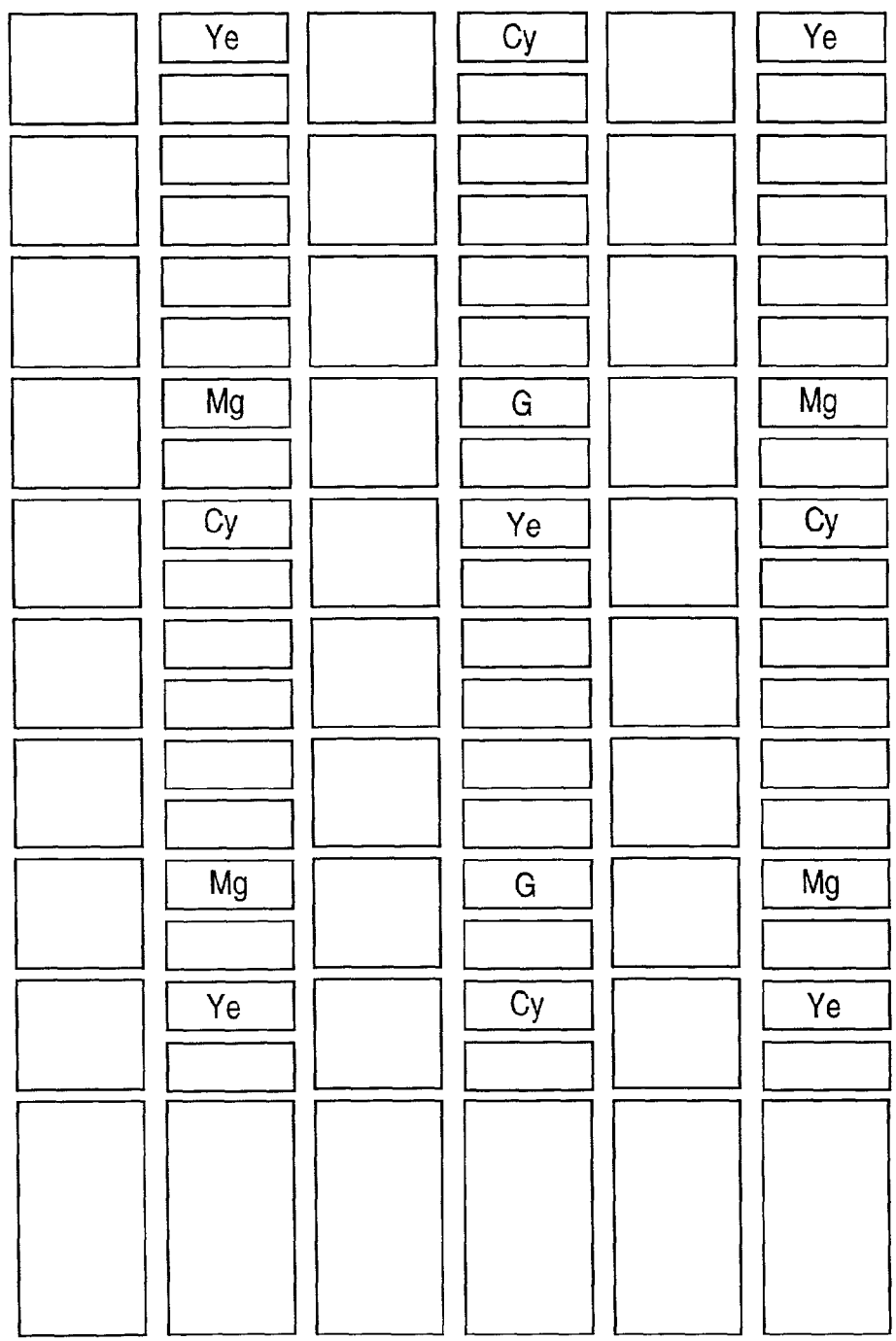

Then, as shown in FIG. 7, the signal charges of the (4n+3)th and (4n+4)th rows, not having been read, are dissipated for example to the substrate. From this point, the pixels 1 initiate the accumulation of the signal charges by photoelectric conversion, but such signal charge accumulation is not illustrated.

Figure 8:
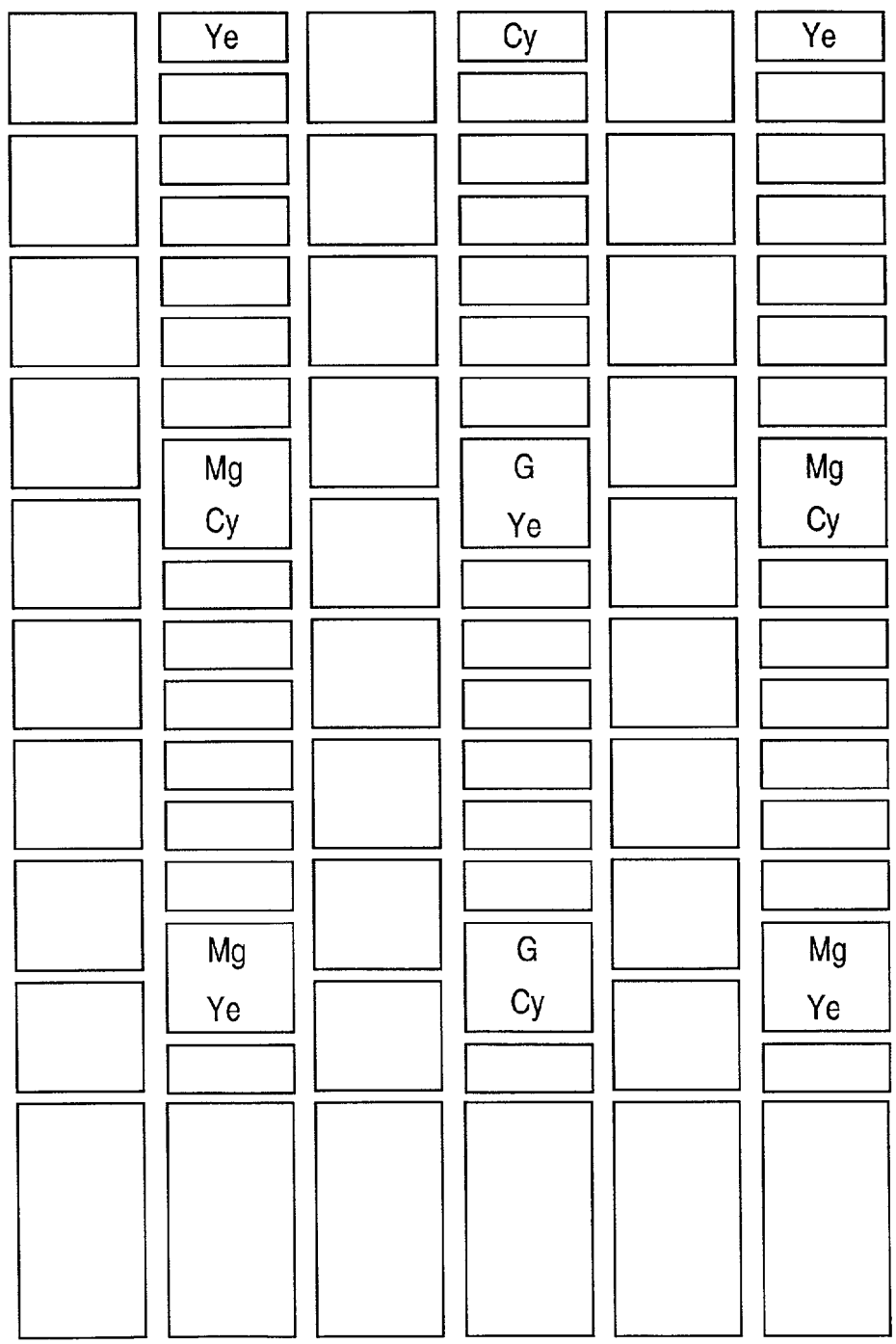

Then, as shown in FIG. 8, the read signal charges of the (4n+1)th and (4n+2)th rows are added and retained by the electrodes D6, D7.

Figure 9:
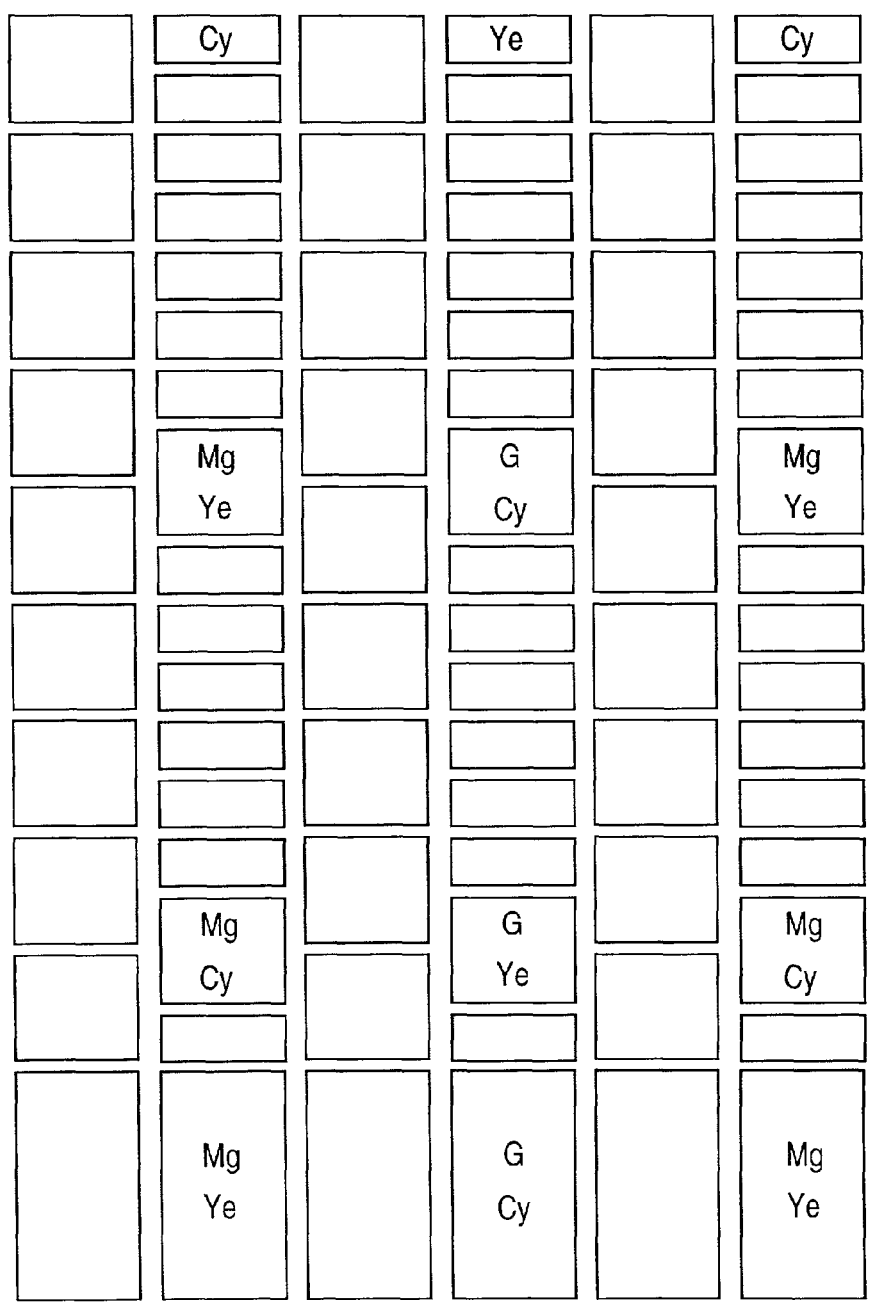

Then, as shown in FIG. 9, there is executed a vertical transfer of the signal charges by 4 pixels. In this operation, the added signal charges of the first and second rows are transferred to the HCCD 3.

Figure 10:
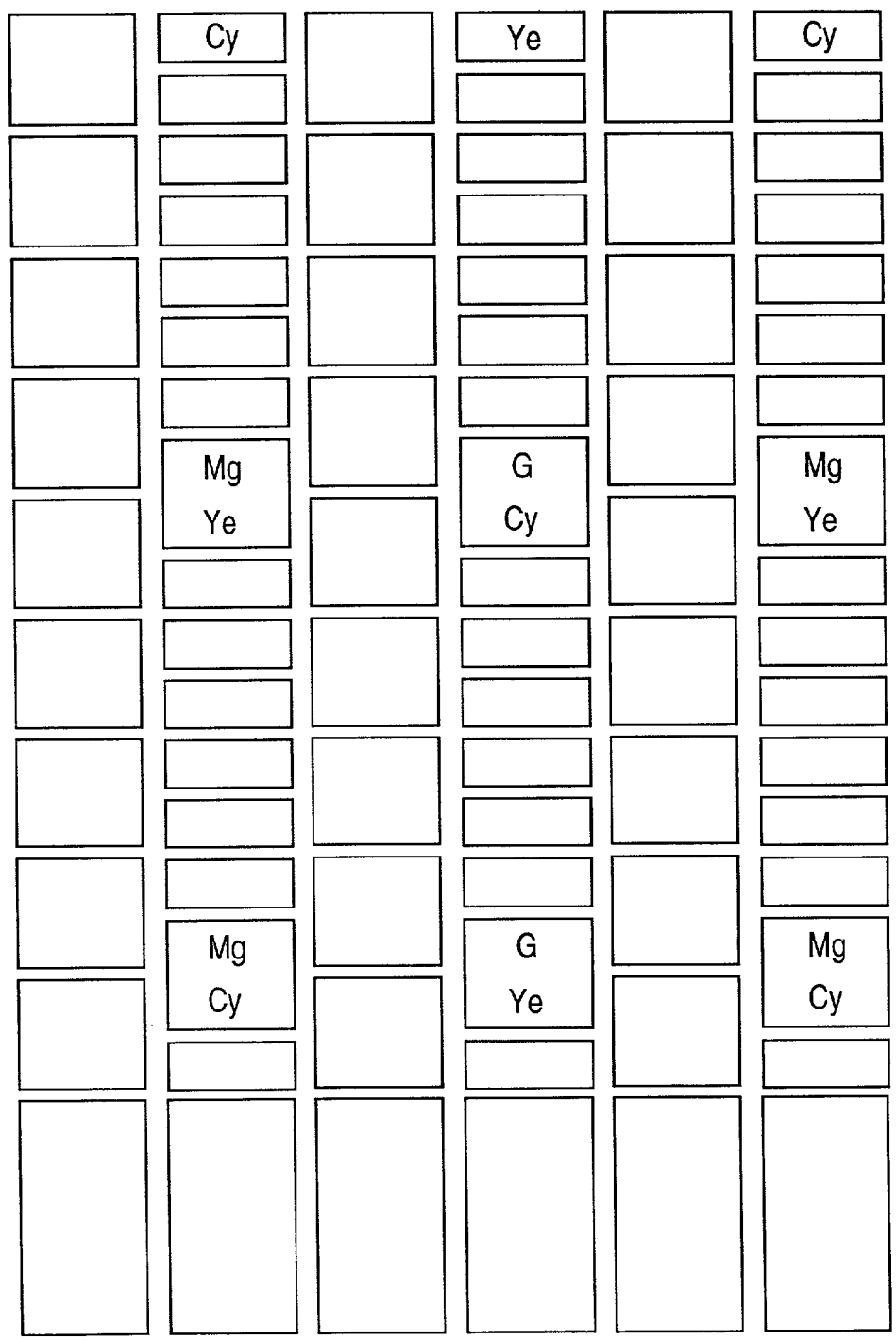
Figure 11:
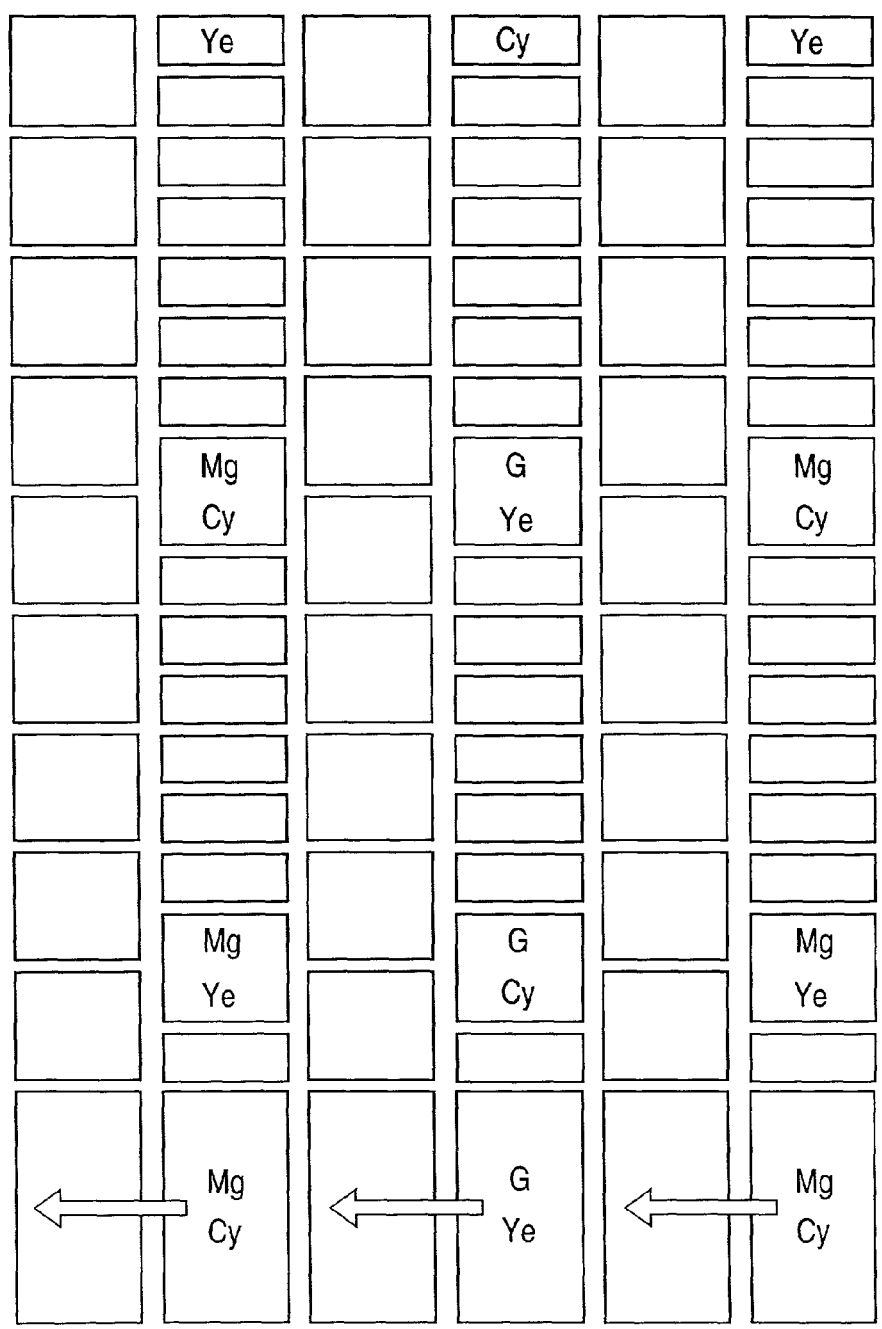

Then, as shown in FIG. 10, the HCCD 3 is given transfer drive pulses whereby the added signal charges of the first and second rows are outputted as an image signal. The outputted image signal S(odd) contains color components (Ye+Mg) and (Cy+G) repeated in this order.

Figure 12:
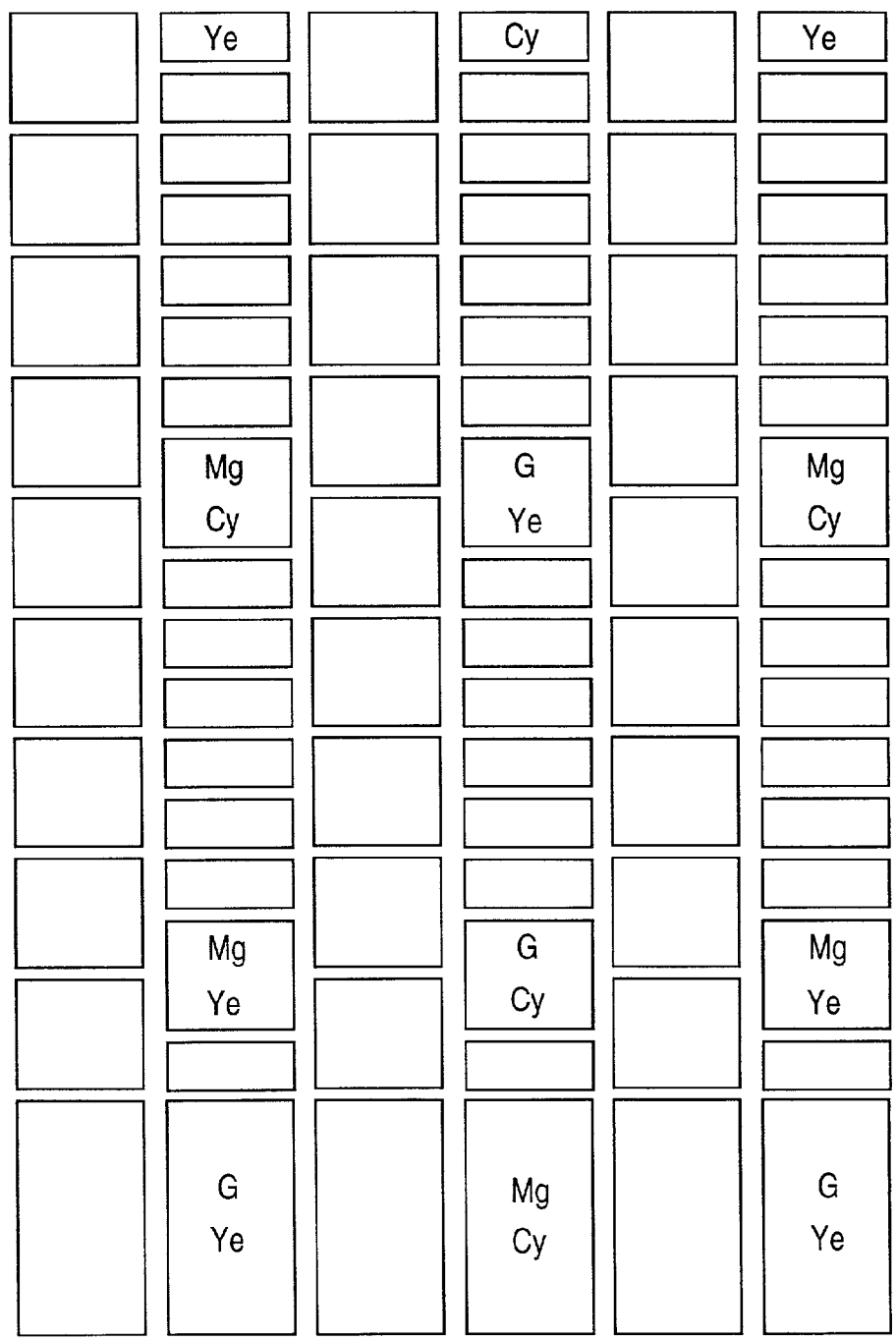

Subsequently, as shown in FIG. 11, there is again executed a vertical transfer by 4 pixels, whereby the added signal charges of the fifth and sixth rows are transferred to the HCCD 3. Then there is executed a horizontal transfer by a pixel, as shown in FIG. 12.

Figure 13:
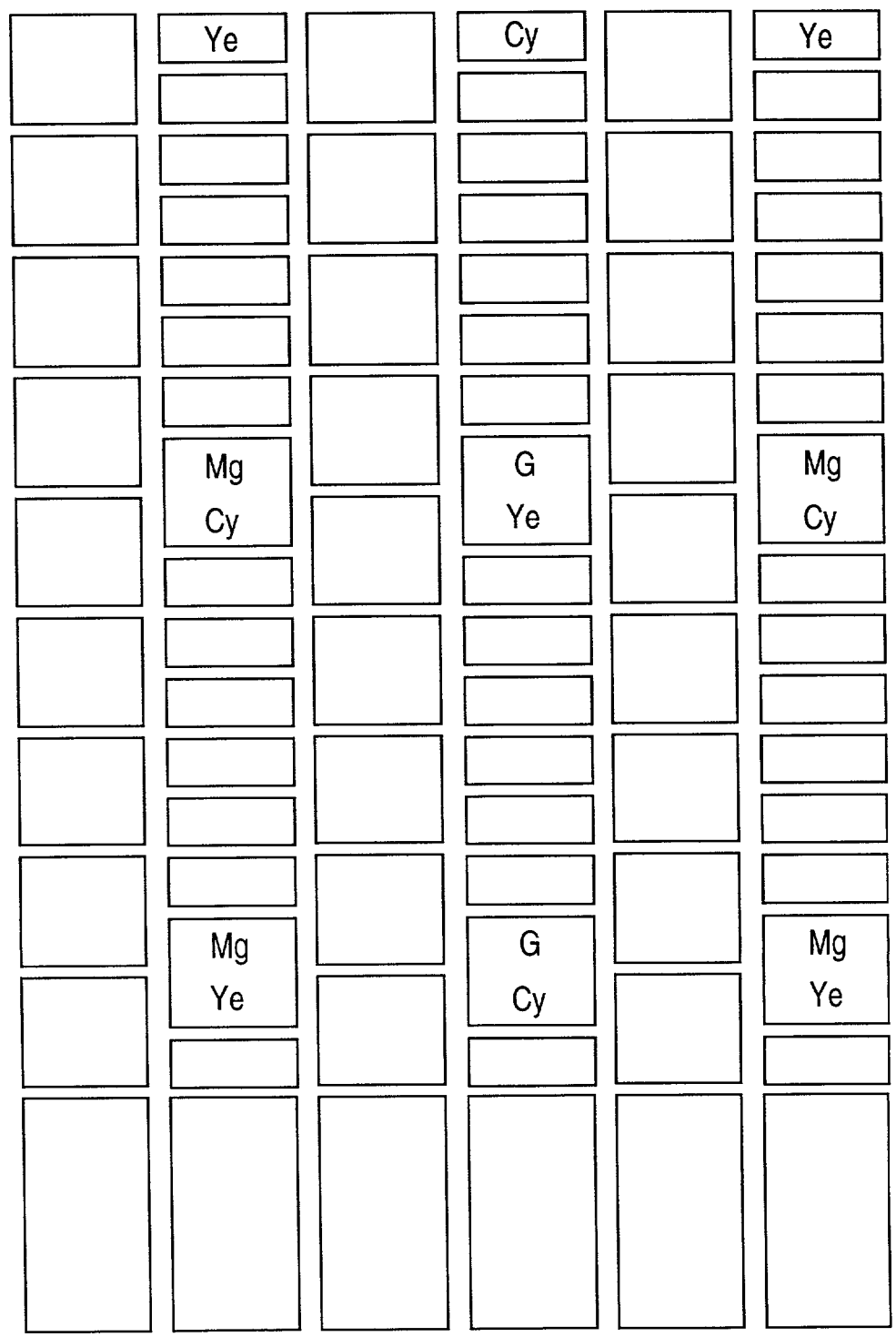

Then, as shown in FIG. 13, the HCCD 3 is given transfer drive pulses whereby the added signal charges of the fifth and sixth rows are outputted as an image signal. The outputted image signal S(even) contains color components (Ye+G) and (Cy+Mg) repeated in this order. The signals S(odd) and S(even) constitute line-sequential color difference signals. The horizontal transfer by a pixel shown in FIG. 12 is to match the timings of the signals S(odd) and S(even). Thereafter the operations shown in FIGS. 9 to 13 are repeated, whereby obtained is an image signal corresponding to a row in every 4 rows in the vertical direction. This image signal is a line-sequential color difference signal.

The image pickup device of the present first embodiment achieves the output of such line-sequential color difference signal, including the above-explained thinning-out process, in the following manner. In response to a control signal from the synchronization control circuit 11, the drive circuit 8 provides the image pickup element 7 with such drive pulses as to output a signal subjected to the required thinned out process. The signal outputted from the image pickup element 7 is processed in the signal process circuit 9 according to a control signal from the synchronization control circuit 11, and is outputted as a line-sequential color difference signal from the output unit 4 of the image pickup element 7.

The output image signal, being a line-sequential color difference signal, can be used in a color signal processing for example in a video camera. If necessary there is further executed a thinning-out or an interpolation in the horizontal direction, according to the number of display pixels of the image display unit 10 in the horizontal direction.

As explained in the foregoing, the image pickup device of the present first embodiment can read the signal charges from predetermined rows in thinned-out manner, from the image pickup element 7, even if the image display unit 10 has a number of pixels in the vertical direction smaller than the number of pixels that can be outputted from the image pickup device 11 in a single image taking operation, thereby allowing to display the taken image in synchronization with the display speed of the image display unit 10 without relying on an image memory or particular thinning-out means. It is also possible to form a color image signal, from the image signal read in thinned-out manner.

It is possible in FIG. 6, in combination with the above-explained operation of the first embodiment, to apply read-out drive pulses φV3 and φV1 to the electrodes D3, D1 of the VCCD 2 thereby reading the signal charges of the (4n+3)th and (4n+4)th rows to the respectively corresponding electrodes D3, D1 and to output such signal charges after mutual addition. The image signal obtained in such case can also be utilized in an image display unit capable of interlaced display.

In the following there will be explained a second embodiment, in which components equivalent to those in the first embodiment will be represented by the numbers or symbols same as in the first embodiment.

The image pickup device of the second embodiment is substantially same in configuration as that of the first embodiment, but is different in the method of reading the signal charges.

Also in this image pickup device, as in the first embodiment, the color filter array is composed of a matrix arrangement of color filters as shown in FIG. 3. There is explained a case wherein the color filter array is composed of plural first to fourth color filters, in which the first color filter is yellow (Ye), the second color filter is cyan (Cy), the third color filter is magenta (Mg) and the fourth color filter is green (G). More specifically, the color filter at a (4n+1)th row and an odd-numbered column is same as that at a (4n+3)th row and an even-numbered column and both color filters are Ye or Cy; the color filter at a (4n+2)th row and an odd-numbered column is same as that at a (4n+4)th row and an even-numbered column and both color filters are Mg; the color filter at a (4n+1)th row and an even-numbered column is same as that at a (4n+3)th row and an odd-numbered column and both color filters are Ye or Cy; and the color filter at a (4n+2)th row and an even-numbered column is same as that at a (4n+4)th row and an odd-numbered column and both color filters are G.

In the following there will be explained, with reference to FIGS. 14 to 25, the method of reading the signal charges accumulated in the pixels 1 respectively corresponding to the color filters and outputting the corresponding image signal. The present second embodiment is capable of thinning-out the signal charges from the pixels 1 of predetermined rows, thereby outputting the charges of a row in every 4 rows in the vertical directions as the image signal.

Figure 14:
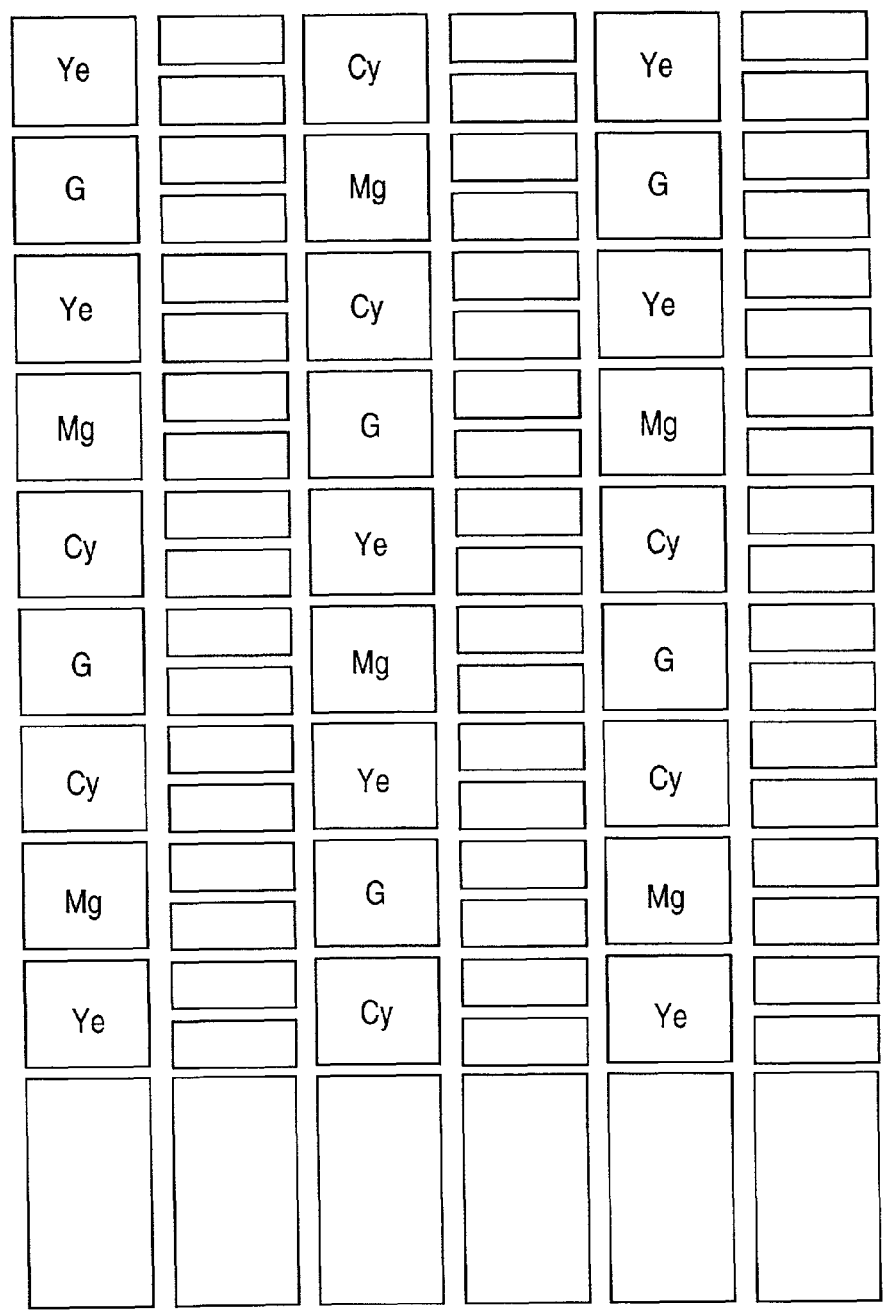

The read-out operation is started from a state in which signal charges respectively corresponding to the color filters are accumulated in the pixels 1, as shown in FIG. 14.

Figure 15:
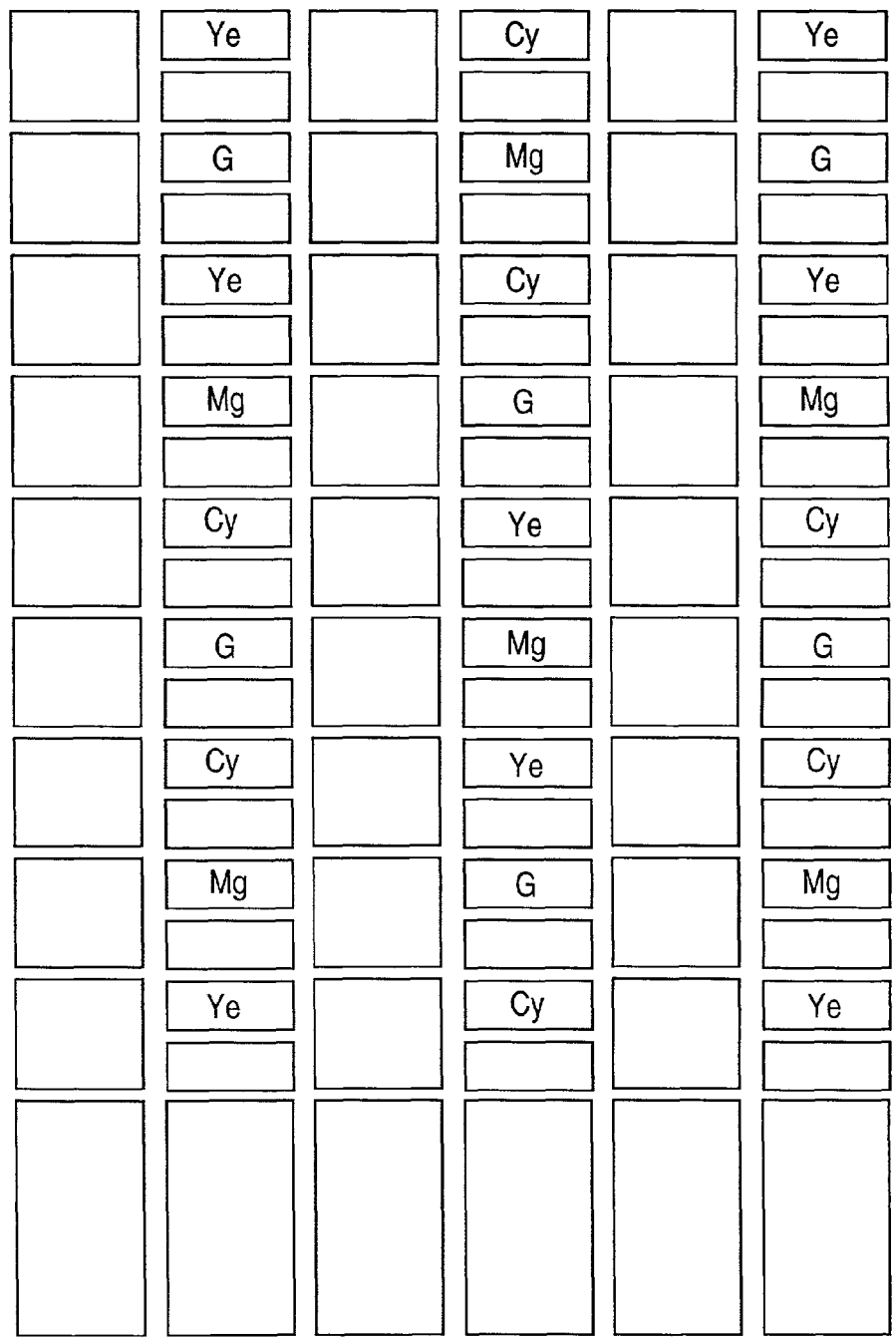

At first, within the VCCD 2, the electrodes D1, D3, D5 and D7 are respectively given the read-out drive pulses φV1, φ3, φ5 and φV7 as shown in FIG. 15 to read the signal charges of the pixels 1. From this point, the pixels 1 initiate the accumulation of the signal charges by photoelectric conversion, but such signal charge accumulation is not illustrated.

Figure 16:
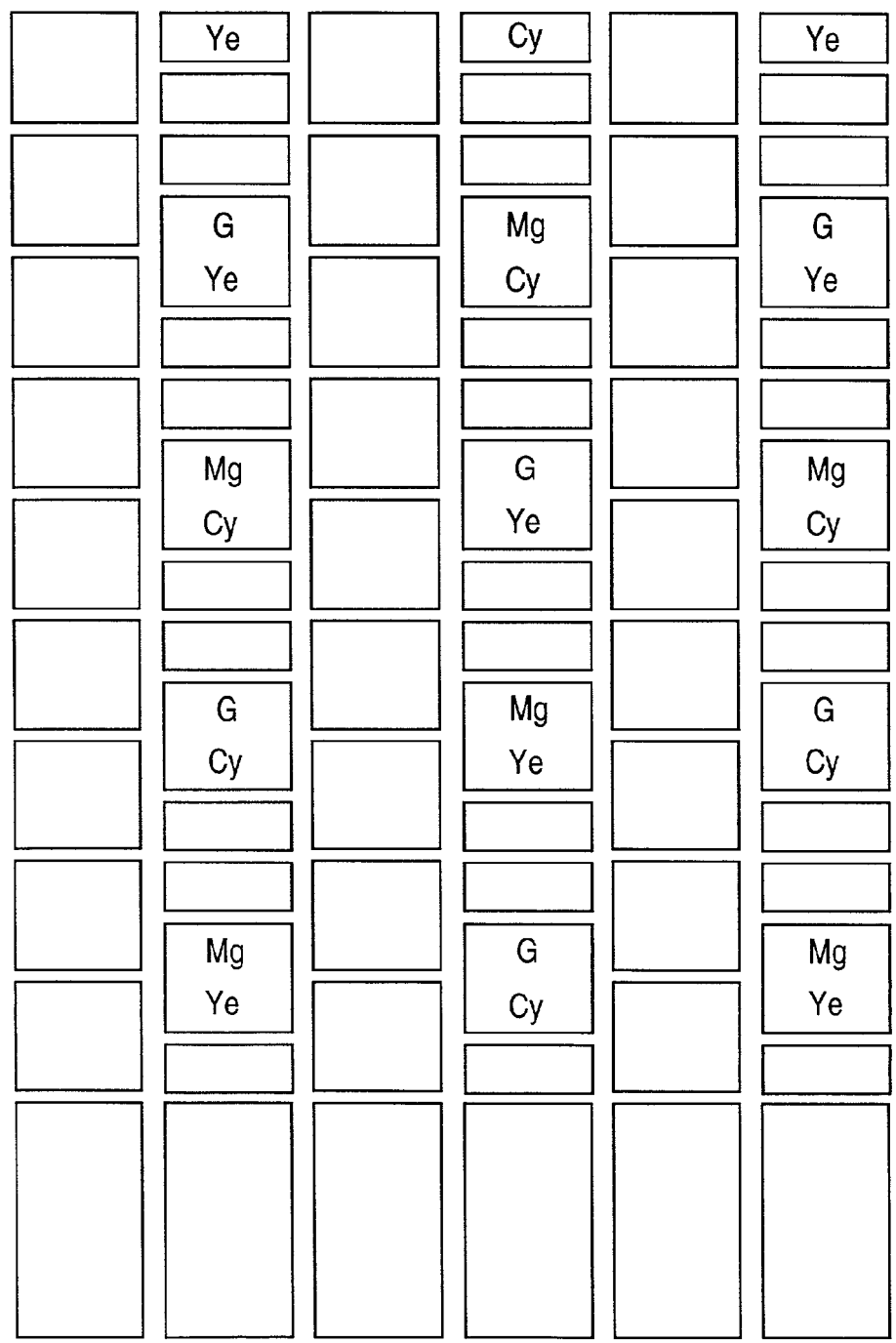

Then, as shown in FIG. 16, there are executed the addition of the signal charges of the (4n+1)th and (4n+2)th rows, and the addition of the signal charges of the (4n+3)th and the (4n+4)th rows.

Figure 17:
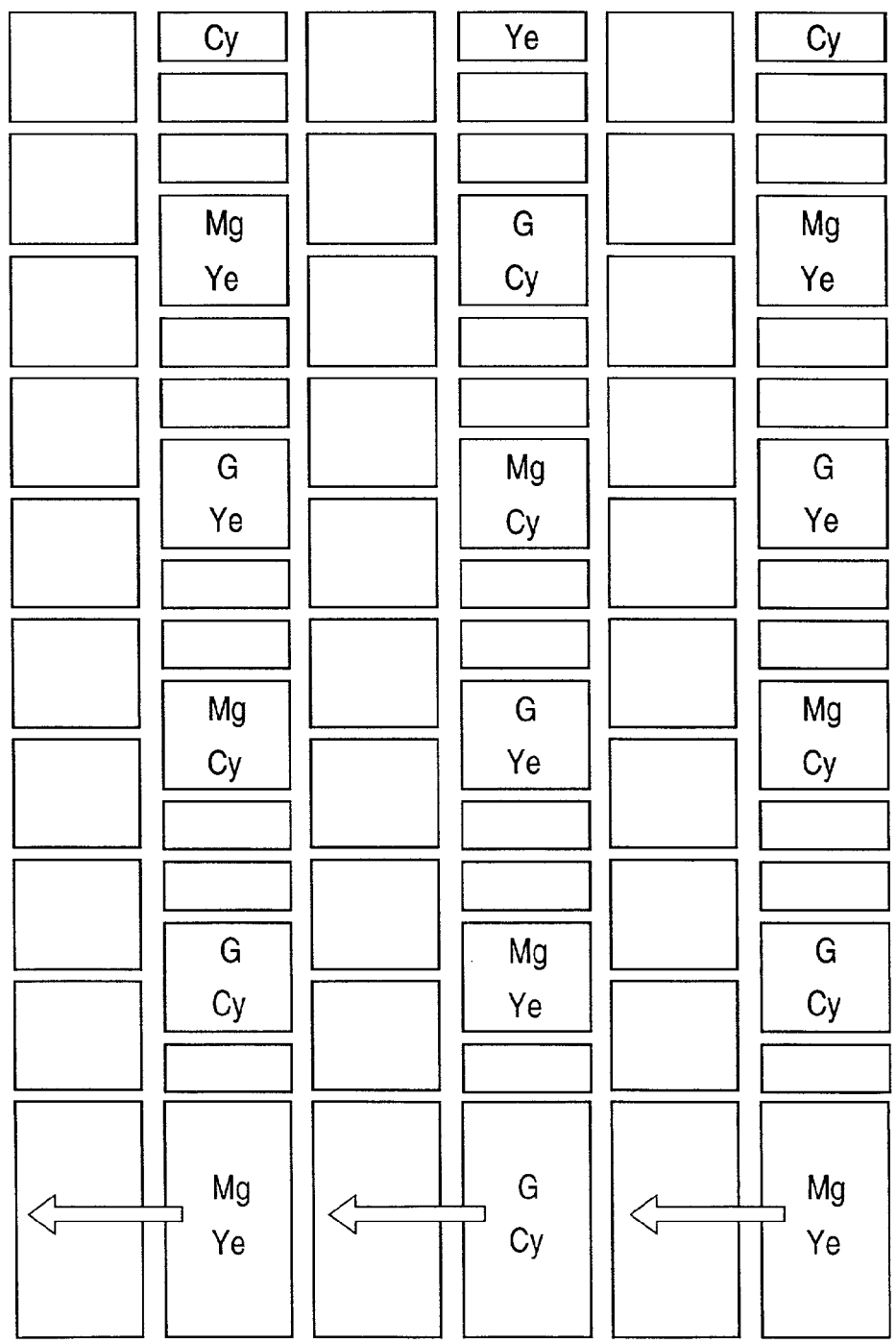

Then, as shown in FIG. 17, there is executed a vertical transfer of the signal charges by 2 pixels. In this operation, the added signal charges of the first and second rows are transferred to the HCCD 3.

Figure 18:
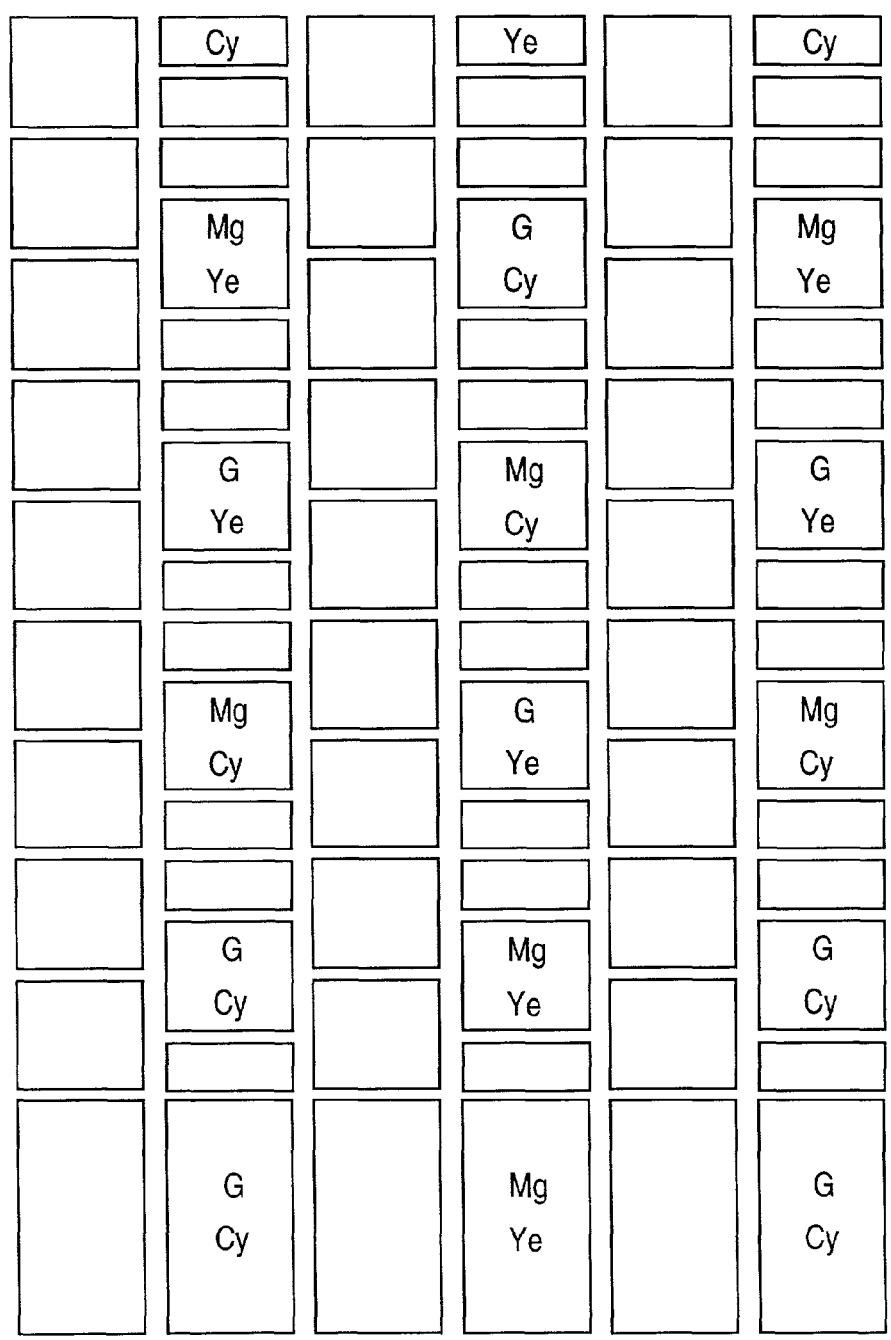

Then, as shown in FIG. 18, there is executed a horizontal transfer by a pixel, in order that the added signal charges of the third and fourth rows, to be next transferred to the HCCD 3, are added to the signal charges corresponding to the color filters of same colors within the added signal charges of the first and second rows.

Figure 19:
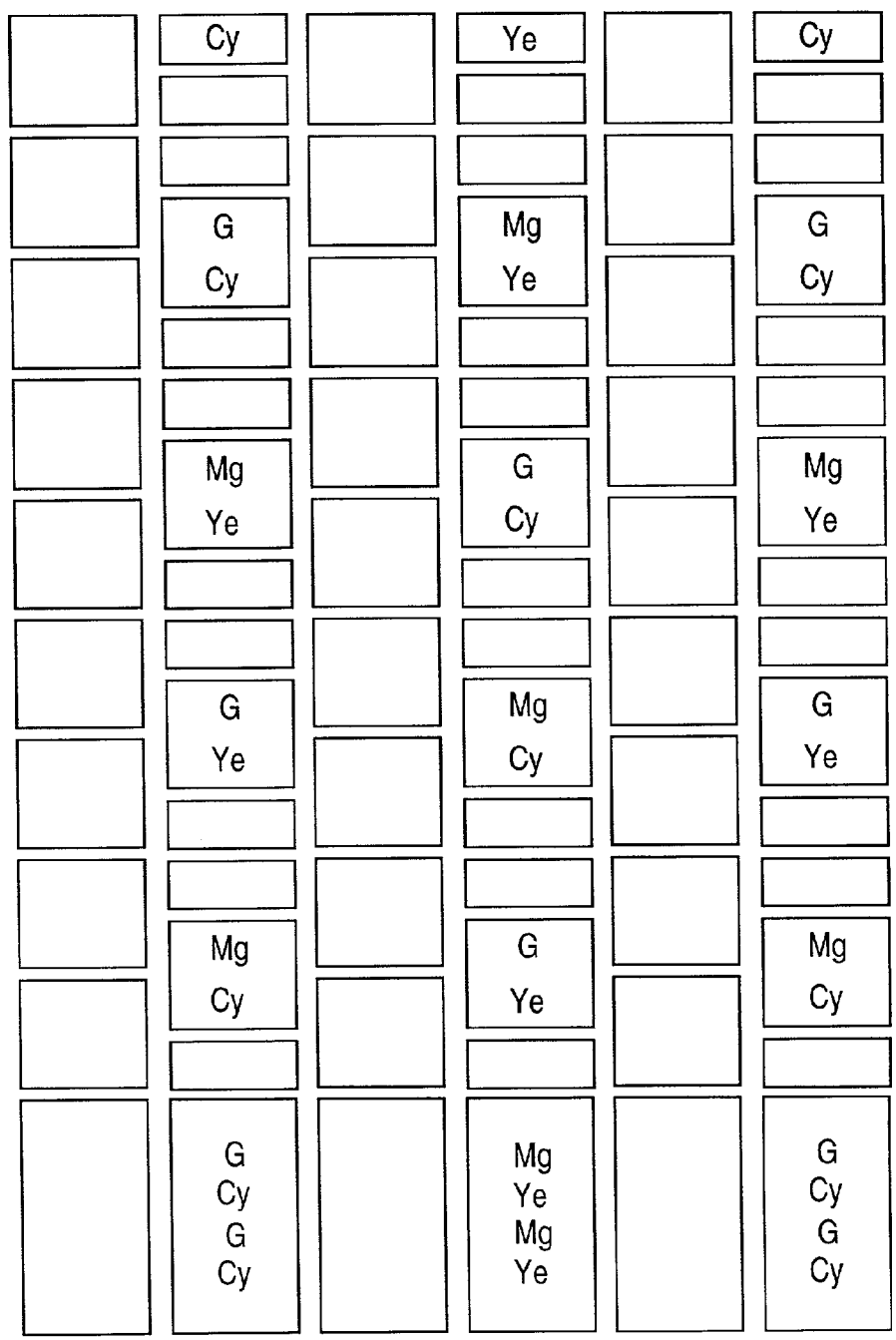

Then, as shown in FIG. 19, there is executed a vertical transfer by 2 pixels. In this operation, the added signal charges of the third and fourth rows are added to the signal charges corresponding to the color filters of same colors, within the added signal charges of the first and second rows.

Figure 20:
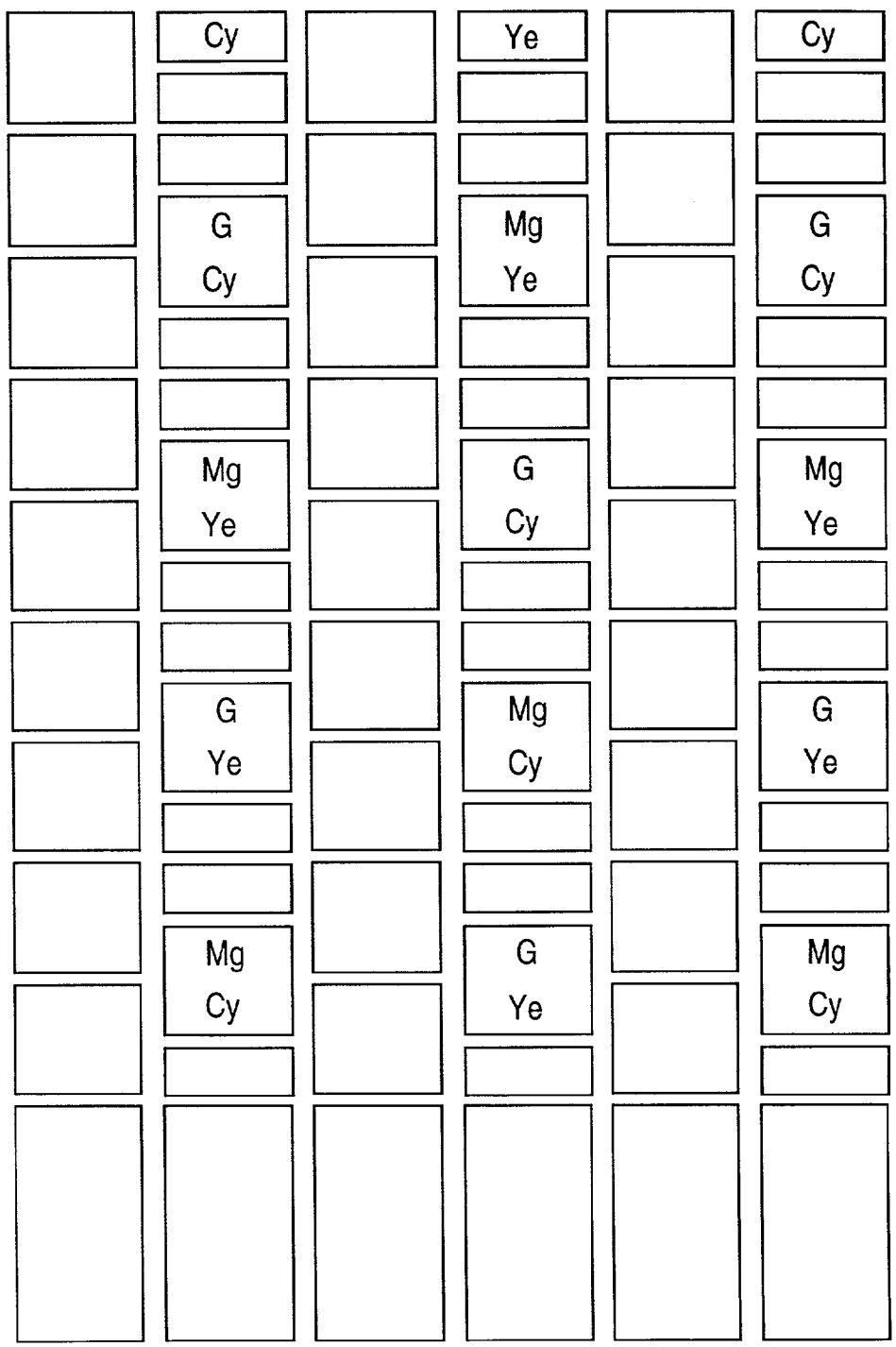
Figure 21:
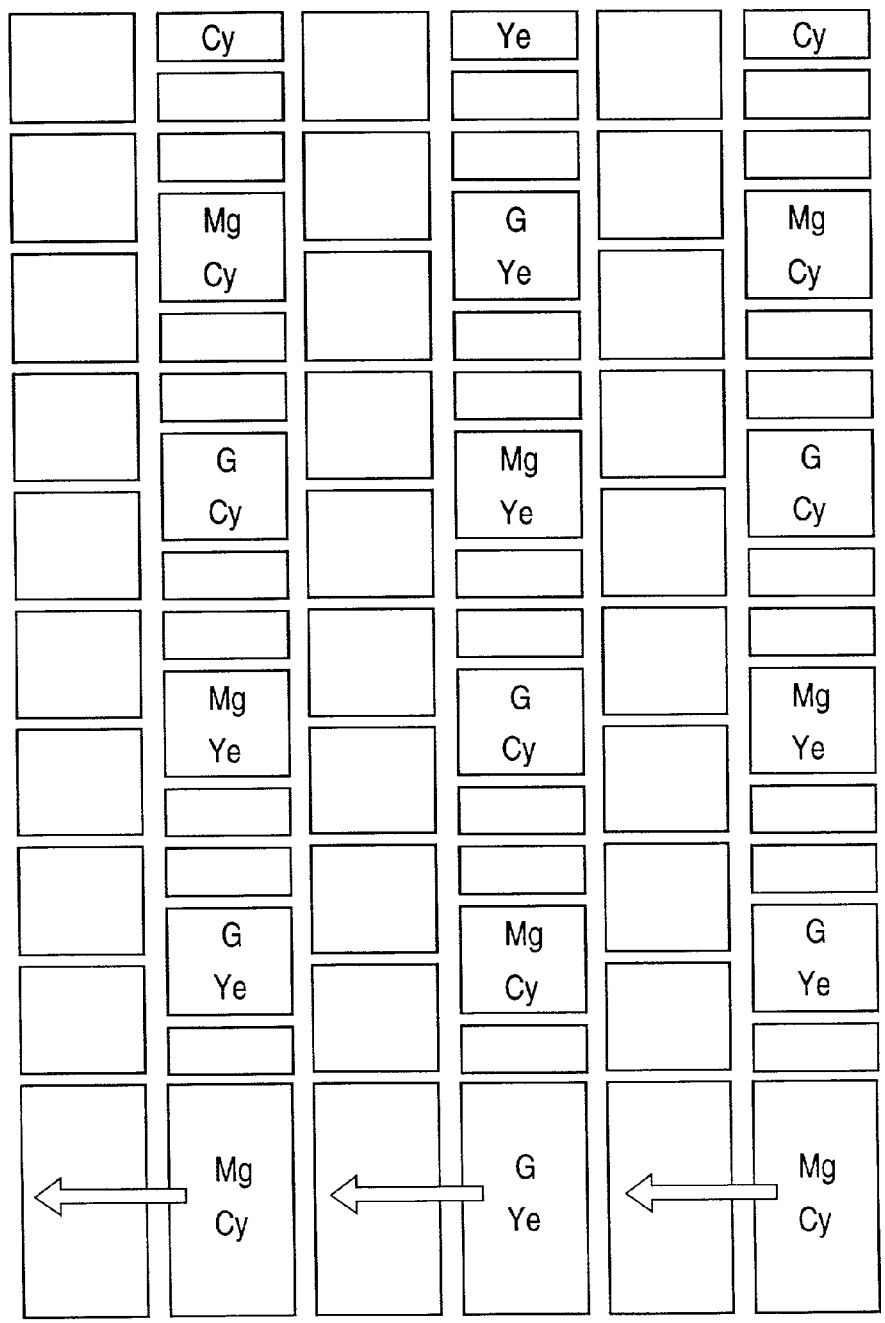

Then, as shown in FIG. 20, the HCCD 3 is given transfer drive pulses whereby the added signal charges of the first, second, third and fourth rows are outputted as an image signal. The outputted image signal S'(odd) contains color components (Cy+G) and (Ye+Mg) repeated in this order.

Subsequently, as shown in FIG. 21, there is again executed a vertical transfer by 2 pixels, whereby the added signal charges of the fifth and sixth rows are transferred to the HCCD 3.

Figure 22:
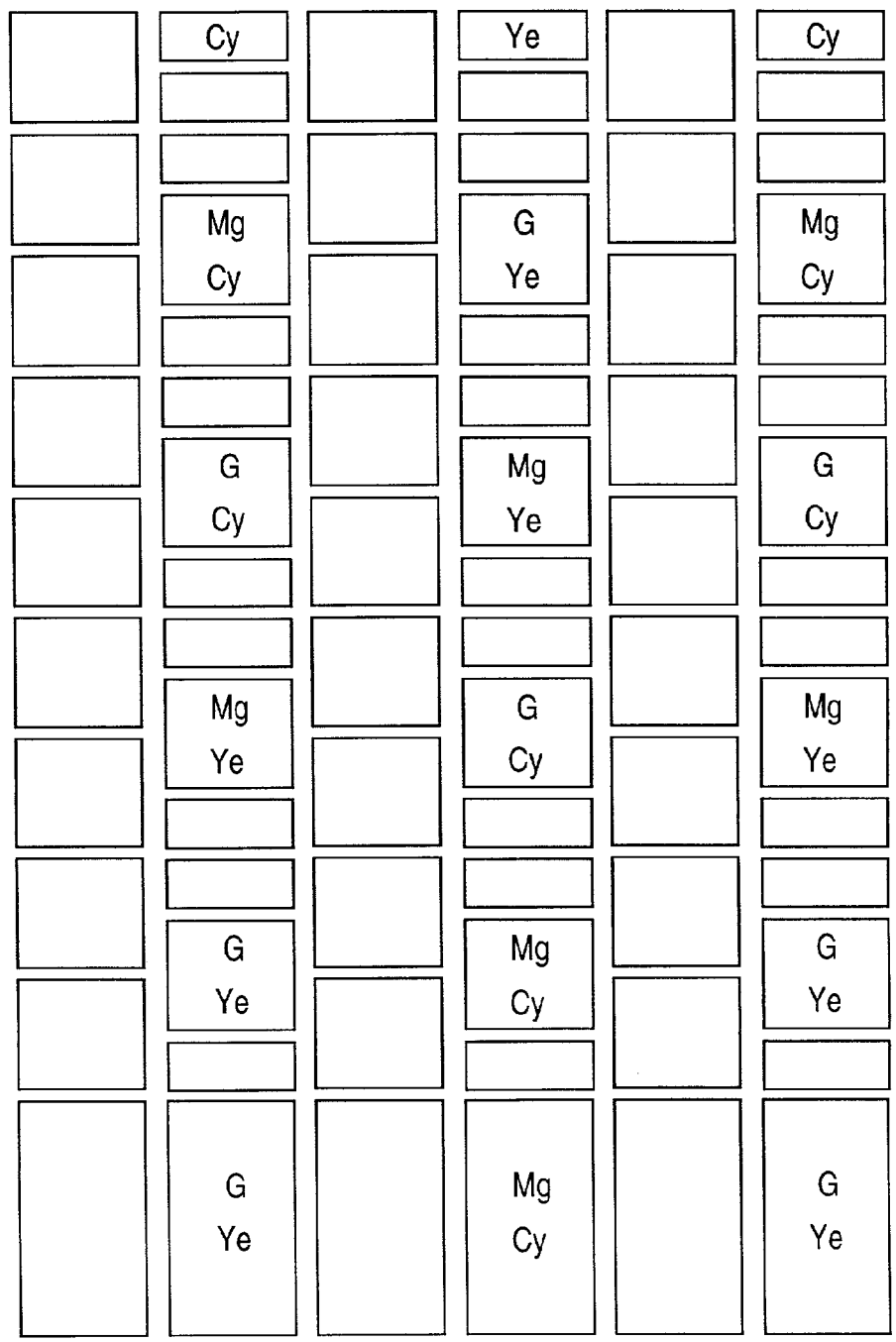

Then, as shown in FIG. 22, there is executed a horizontal transfer by a pixel, in order that the added signal charges of the seventh and eighth rows, to be next transferred to the HCCD 3, are added to the signal charges corresponding to the color filters of same colors within the added signal charges of the fifth and sixth rows.

Figure 23:
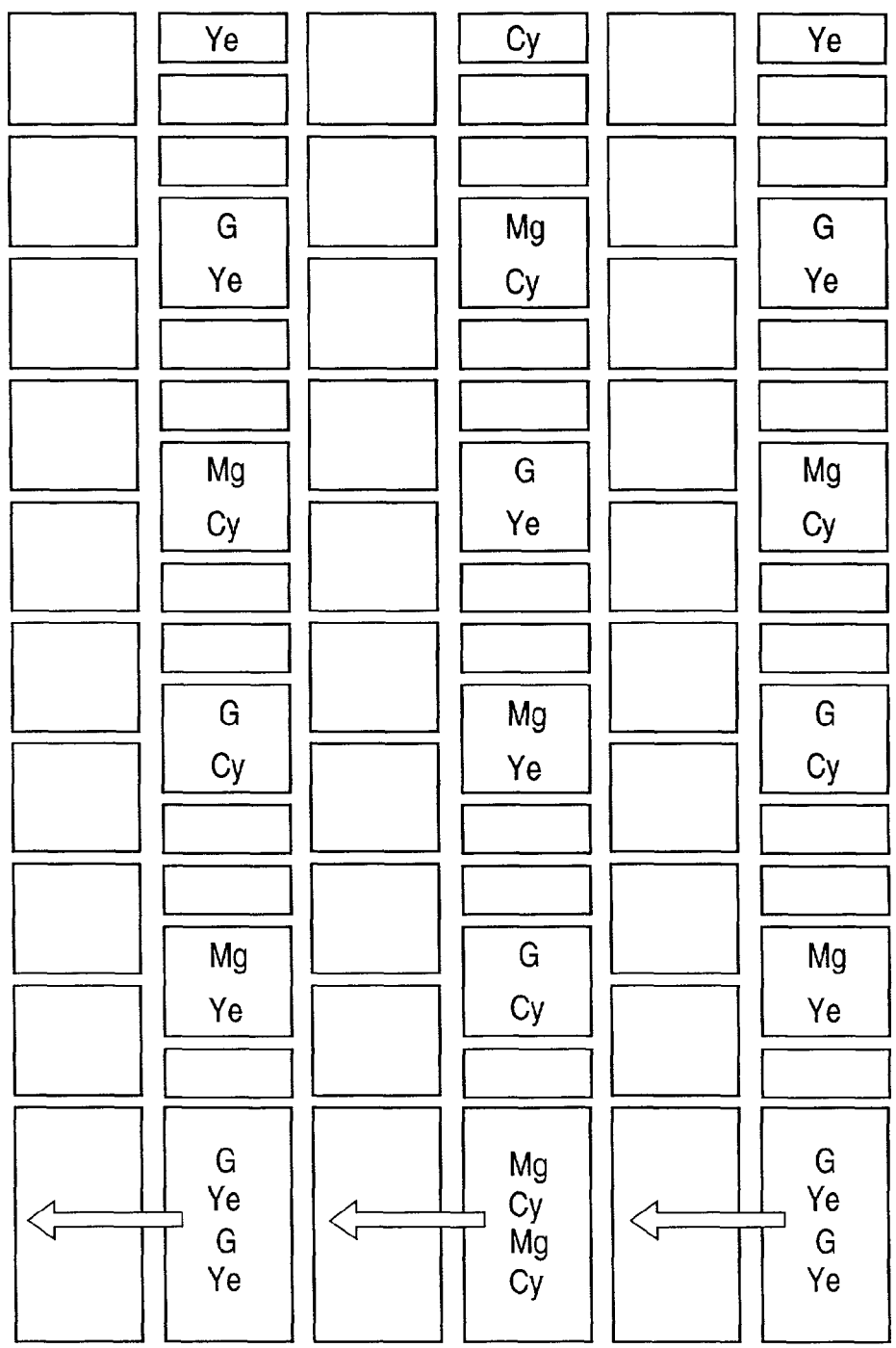

Then, as shown in FIG. 23, there is executed a vertical transfer by 2 pixels. In this operation, the added signal charges of the seventh and eighth rows are added to the signal charges corresponding to the color filters of same colors, within the added signal charges of the fifth and sixth rows.

Figure 24:
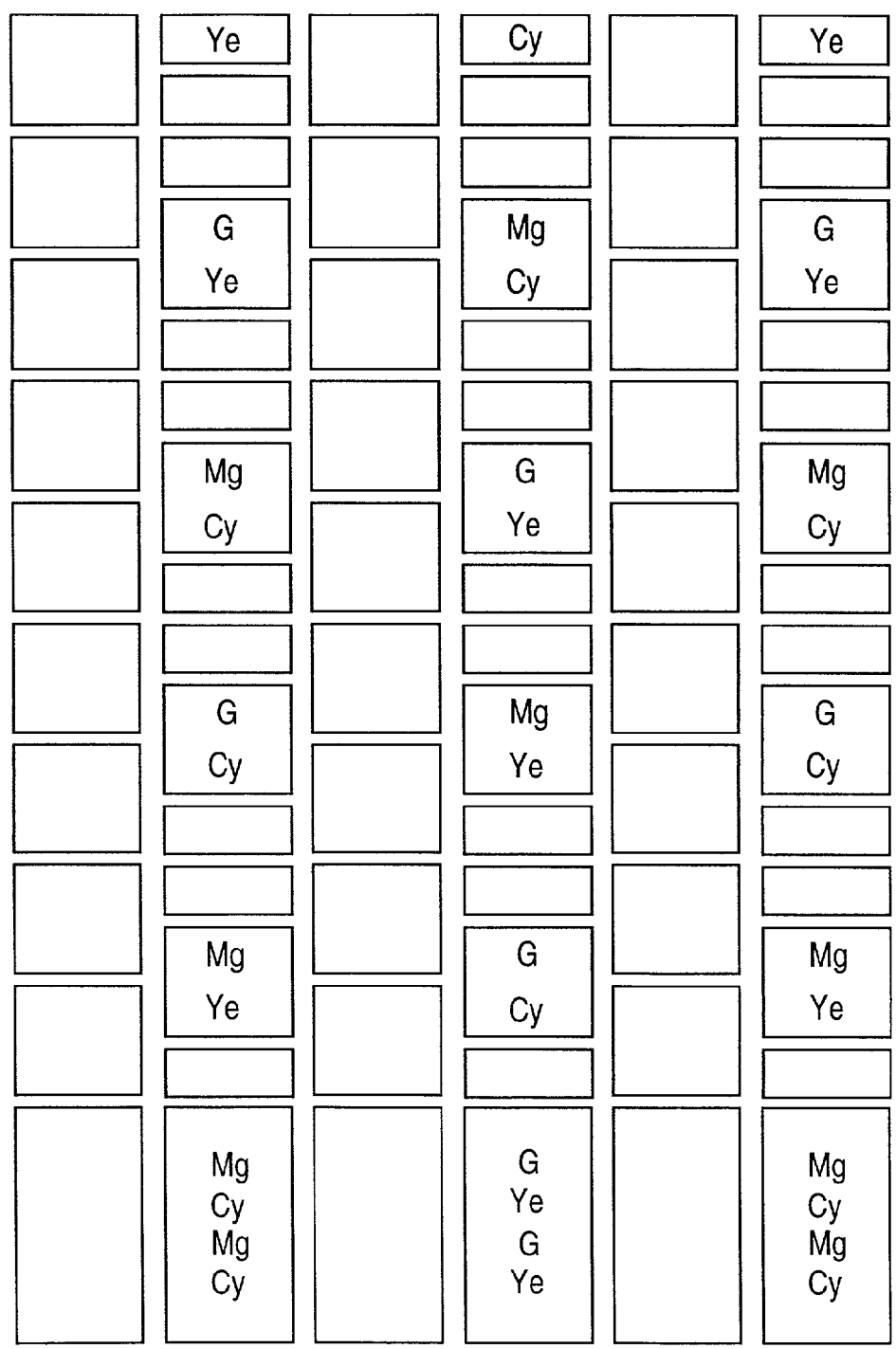

Then there is executed a horizontal transfer by a pixel, as shown in FIG. 24.

Figure 25:
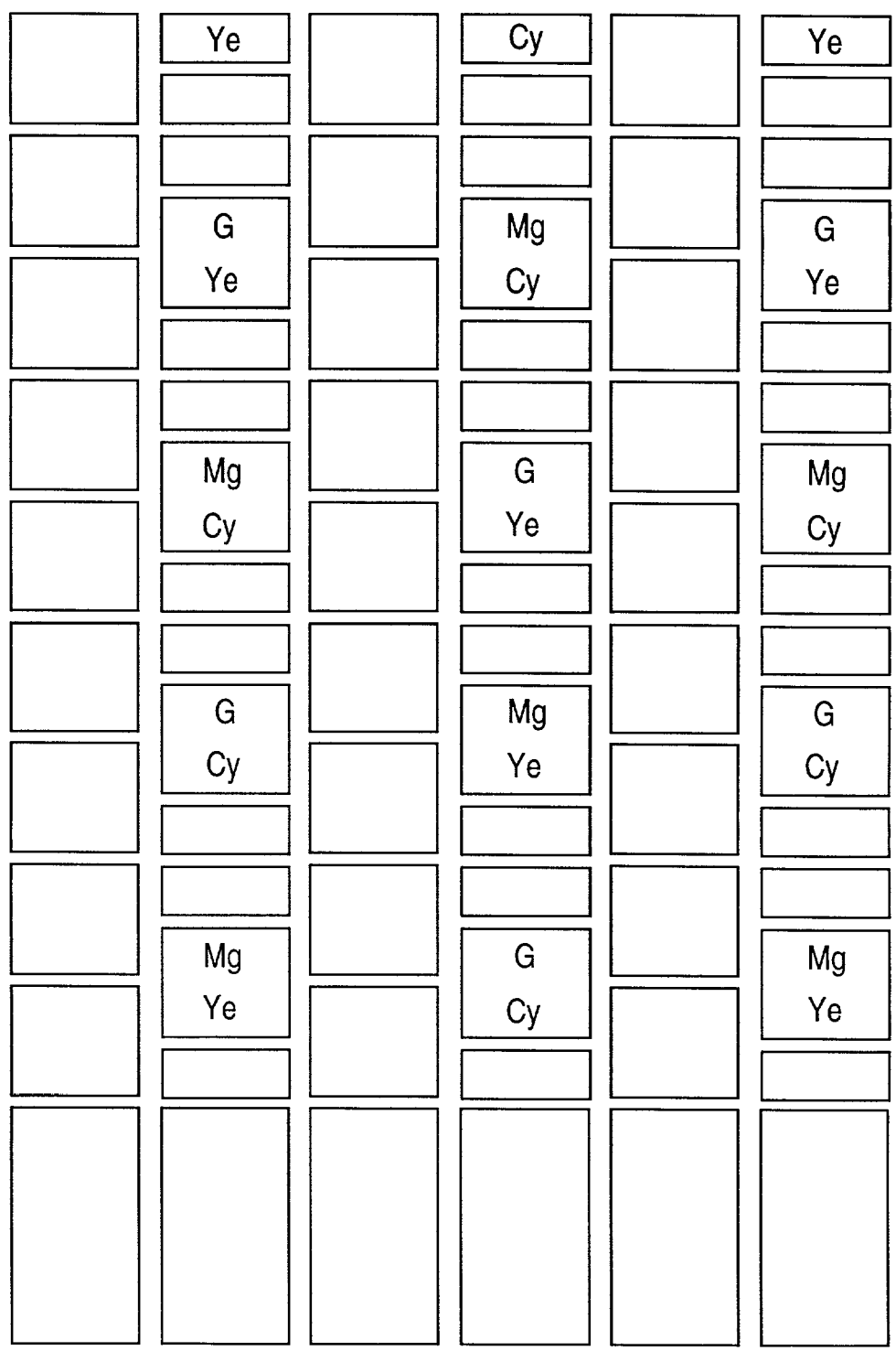

Then, as shown in FIG. 25, the HCCD 3 is given transfer drive pulses whereby the added signal charges of the fifth, sixth, seventh and eighth rows are outputted as an image signal. The outputted image signal S'(even) contains color components (Cy+Mg) and (Ye+G) repeated in this order. The signals S'(odd) and S'(even) constitute line-sequential color difference signals. The horizontal transfer by a pixel shown in FIG. 24 is to match the timings of the signals S'(odd) and S'(even). Thereafter the operations shown in FIGS. 17 to 25 are repeated, whereby obtained is an image signal corresponding to a row in every 4 rows in the vertical direction, among the image signal of an image frame. This image signal is a line-sequential color difference signal in which S'(odd) and S'(even) are cyclically repeated.

The output image signal, being a line-sequential color difference signal, can be used in a color signal processing for example in a video camera. If necessary there is further executed a thinning-out or an interpolation in the horizontal direction, according to the number of display pixels of the image display unit 10 in the horizontal direction.

As explained in the foregoing, the image pickup device of the present second embodiment can read the signal charges from predetermined rows in thinned-out manner, from the image pickup element 7, even if the image display unit 10 has a number of pixels in the vertical direction smaller than the number of pixels that can be outputted from the image pickup device 11 in a single image taking operation, thereby allowing to display the taken image in synchronization with the display speed of the image display unit 10 without relying on an image memory or particular thinning-out means. It is also possible to form a color image signal, from the image signal read in thinned-out manner.

Also in the present second embodiment, there is executed, as explained in the foregoing, an addition of the signal charges of 2 pixels present in the vertical direction and of 2 pixels present in the diagonal direction to the first-mentioned pixels, or of 4 pixels in total. It is therefore rendered possible to increase the level of the image signal by adding the signal charges of the pixels which are thinned-out in the first embodiment to those of the pixels which are read in the first embodiment, thereby enabling satisfactory image display even in an image pickup operation in a dark situation.

It is also possible in FIG. 16, in combination with the above-explained operation of the second embodiment, to apply read-out drive pulses φV3, φV4, φV7 and φV8 to the electrodes D3, D4, D7 and D8 the VCCD 2 thereby reading the signal charges, then to add the signal charges of the (4n+2)th and (4n+3)th rows, also to add the signal charges of the (4n+4)th and (4n+5)th rows and to then effect a similar output operation. The image signal obtained in such case can also be utilized in an image display unit capable of interlaced display.

In the following there will be explained certain variations of the image pickup device of the second embodiment. In these variations, components equivalent to those in the second embodiments are represented by corresponding numbers and will not be explained further.

At first there will be explained a variation 1, which is different, from the image pickup device of the second embodiment, in the arrangement of the color filters in the color filter array.

In this variation 1, the color filters of the color filter array are arranged as shown in FIGS. 26 to 30.

In an arrangement shown in FIG. 26, the color filter at a (4n+1)th row and an odd-numbered column and that at a (4n+3)th row and an even-numbered column are same and are Ye; the color filter at a (4n+2)th row and an odd-numbered column and that at a (4n+4)th row and an even-numbered column are same and are Mg or G; the color filter at a (4n+1)th row and an even-numbered column and that at a (4n+3)th row and an odd-numbered column are same and are Cy; and the color filter at a (4n+2)th row and an even-numbered column and that at a (4n+4)th row and an odd-numbered column are same and are Mg or G.

In an arrangement shown in FIG. 27, the color filter at a (4n+1)th row and an odd-numbered column and that at a (4n+3)th row and an even-numbered column are same and are Ye; the color filter at a (4n+2)th row and an odd-numbered column and that at a (4n+4)th row and an even-numbered column are same and are G; the color filter at a (4n+1)th row and an even-numbered column and that at a (4n+3)th row and an odd-numbered column are same and are Cy; and the color filter at a (4n+2)th row and an even-numbered column and that at a (4n+4)th row and an odd-numbered column are same and are Mg.

In an arrangement shown in FIG. 28, the color filter at a (4n+1)th row and an odd-numbered column and that at a (4n+3)th row and an even-numbered column are same and are Ye or Cy; the color filter at a (4n+2)th row and an odd-numbered column and that at a (4n+4)th row and an even-numbered column are same and are Mg or G; the color filter at a (4n+1)th row and an even-numbered column and that at a (4n+3)th row and an odd-numbered column are same and are Ye or Cy; and the color filter at a (4n+2)th row and an even-numbered column and that at a (4n+4)th row and an odd-numbered column are same and are G or Mg.

In an arrangement shown in FIG. 29, the color filter at a (4n+1)th row and an odd-numbered column and that at a (4n+3)th row and an even-numbered column are same and are Ye; the color filter at a (4n+2)th row and an odd-numbered column and that at a (4n+4)th row and an even-numbered column are same and are Mg; the color filter at a (4n+1)th row and an even-numbered column and that at a (4n+3)th row and an odd-numbered column are same and are Cy; and the color filter at a (4n+2)th row and an even-numbered column and that at a (4n+4)th row and an odd-numbered column are same and are G.

Figure 30:
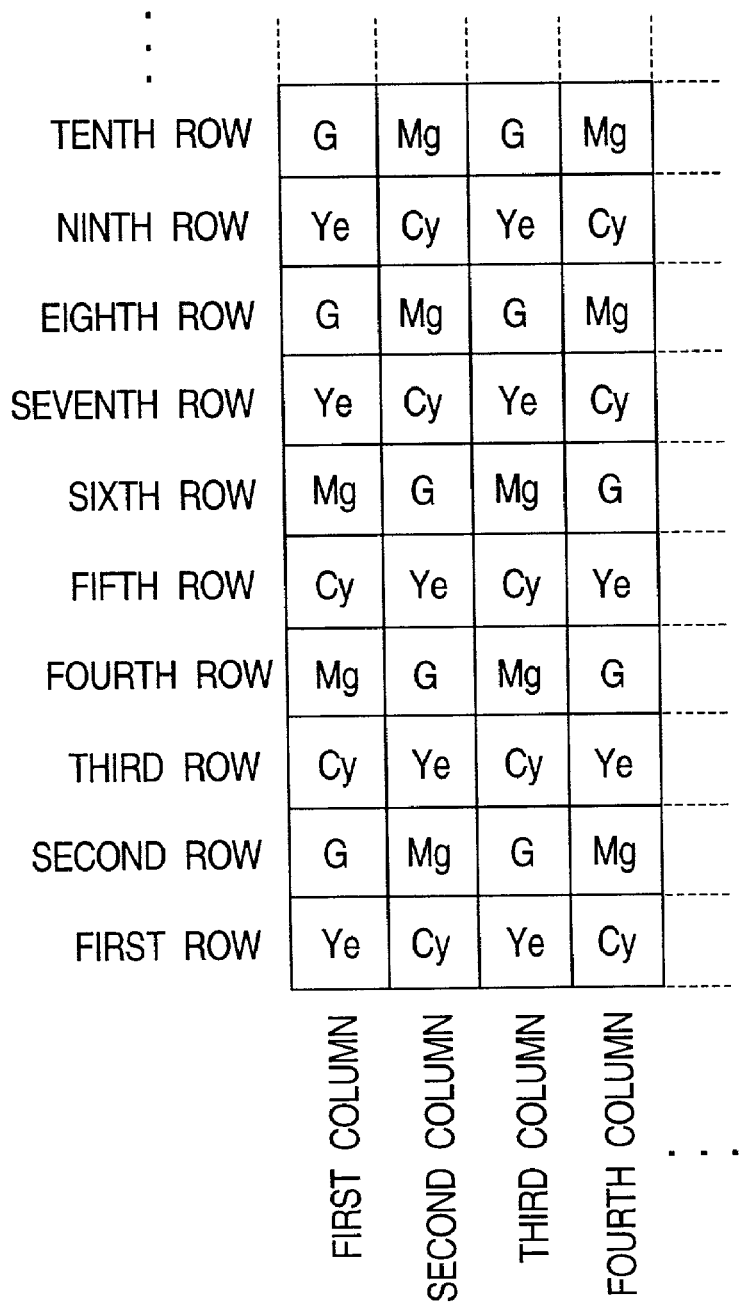
Figure 37:
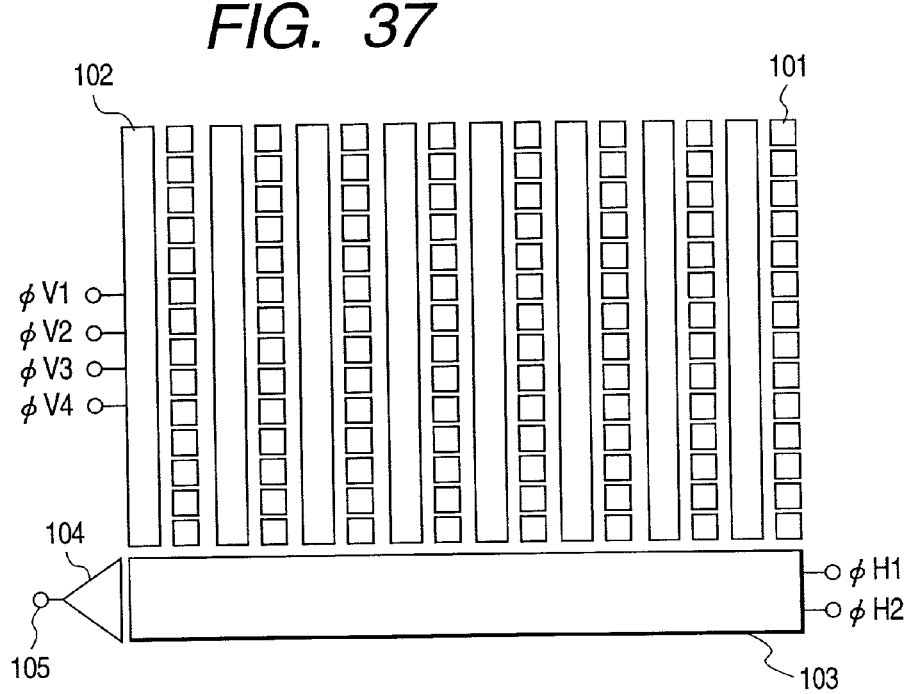
FIG. 37 is a block diagram of a conventional image pickup device.
Figure 38:
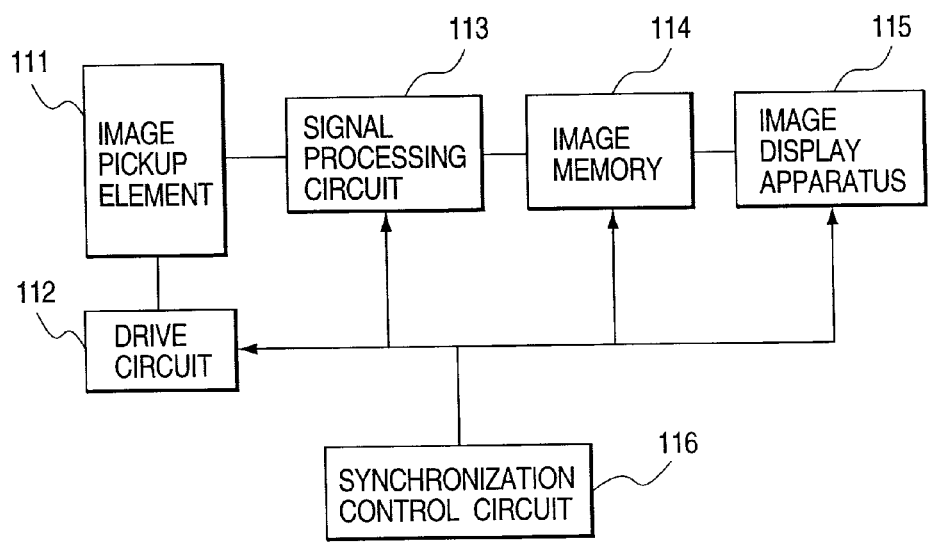
FIG. 38 is a schematic view of an image pickup element constituting the conventional image pickup device.

In an arrangement shown in FIG. 30, the color filter at a (4n+1)th row and an odd-numbered column and that at a (4n+3)th row and an even-numbered column are same and are Ye or Cy; the color filter at a (4n+2)th row and an odd-numbered column and that at a (4n+4)th row and an even-numbered column are same and are G or Mg; the color filter at a (4n+1)th row and an even-numbered column and that at a (4n+3)th row and an odd-numbered column are same and are Cy or Ye; and the color filter at a (4n+2)th row and an even-numbered column and that at a (4n+4)th row and an odd-numbered column are same and are Mg or G.

The image pickup device of the present variation 1, as in the second embodiment, can read the signal charges from predetermined rows in thinned-out manner, from the image pickup element 7, even if the image display unit 10 has a number of pixels in the vertical direction smaller than the number of pixels that can be outputted from the image pickup device 11 in a single image pickup operation. It is therefore possible to display the taken image in synchronization with the display speed of the image display unit 10 without utilizing an image memory or particular thinning-out means. It is also possible to form a color image signal, from the image signal read in thinned-out manner.

Also in the present variation 1, in any of the color filter arrangement shown in FIGS. 26 to 30, there is executed the addition of the signal charges of 2 pixels in the vertical direction and of 2 pixels in the diagonal direction, or of 4 pixels in total. It is therefore possible to increase the level of the image signal by adding the signal charges of the pixels which are thinned-out in the first embodiment to those of the pixels which are read in the first embodiment, thereby enabling satisfactory image display even in an image pickup operation in a dark situation.

In the following there will be explained a variation 2, which is different, from the image pickup device of the second embodiment, in the arrangement of the color filters in the color filter array and in the method of adding the signal charges.

In this variation 2, the color filters of the color filter array are arranged as shown in FIGS. 31 to 36.

In an arrangement shown in FIG. 31, in the odd-numbered columns, the color filters at (8n+1)th, (8n+3)th and (8n+5)th rows are same and are Ye; those at (8n+2)th, (8n+4)th and (8n+6)th rows are same and are Mg; the color filter at an (8n+7)th row is Cy; and the color filter at an (8n+8)th row is G. In the even-numbered columns, the color filters at (8n+1)th, (8n+3)th and (8n+5)th rows are same and are Cy; those at (8n+2)th, (8n+4)th and (8n+6)th rows are same and are G; the color filter at an (8n+7)th row is Ye; and the color filter at an (8n+8)th row is Mg.

In an arrangement shown in FIG. 32, in the odd-numbered columns, the color filters at (8n+1)th, (8n+3)th and (8n+5)th rows are same and are Ye; those at (8n+2)th, (8n+4)th and (8n+8)th rows are same and are Mg; the color filter at an (8n+7)th row is Cy; and the color filter at an (8n+6)th row is G. In the even-numbered columns, the color filters at (8n+1)th, (8n+3)th and (8n+5)th rows are same and are Cy; those at (8n+2)th, (8n+4)th and (8n+8)th rows are same and are G; the color filter at an (8n+7)th row is Ye; and the color filter at an (8n+6)th row is Mg.

In an arrangement shown in FIG. 33, in the odd-numbered columns, the color filters at (8n+1)th, (8n+3)th and (8n+7)th rows are same and are Ye; those at (8n+2)th, (8n+4)th and (8n+6)th rows are same and are Mg; the color filter at an (8n+5)th row is Cy; and the color filter at an (8n+8)th row is G. In the even-numbered columns, the color filters at (8n+1)th, (8n+3)th and (8n+7)th rows are same and are Cy; those at (8n+2)th, (8n+4)th and (8n+6)th rows are same and are G; the color filter at an (8n+5)th row is Ye; and the color filter at an (8n+8)th row is Mg.

In an arrangement shown in FIG. 34, in the odd-numbered columns, the color filters at (8n+1)th, (8n+3)th and (8n+7)th rows are same and are Ye; those at (8n+2)th, (8n+4)th and (8n+6)th rows are same and are G, the color filter at an (8n+5)th row is Cy; and the color filter at an (8n+8)th row is Mg. In the even-numbered columns, the color filters at (8n+1)th, (8n+3)th and (8n+7)th rows are same and are Cy; those at (8n+2)th, (8n+4)th and (8n+6)th rows are same and are Mg; the color filter at an (8n+5)th row is Ye; and the color filter at an (8n+8)th row is G.

In an arrangement shown in FIG. 35, in the odd-numbered columns, the color filters at (8n+1)th, (8n+3)th and (8n+5)th rows are same and are Cy; those at (8n+2)th, (8n+4)th and (8n+8)th rows are same and are Mg; the color filter at an (8n+7)th row is Ye; and the color filter at an (8n+6)th row is G. In the even-numbered columns, the color filters at (8n+1)th, (8n+3)th and (8n+5)th rows are same and are Ye; those at (8n+2)th, (8n+4)th and (8n+8)th rows are same and are G; the color filter at an (8n+7)th row is Cy; and the color filter at an (8n+6)th row is Mg.

In an arrangement shown in FIG. 36, in the odd-numbered columns, the color filters at (8n+1)th, (8n+3)th and (8n+5)th rows are same and are Ye; those at (8n+2)th, (8n+4)th and (8n+6)th rows are same and are G; the color filter at an (8n+7)th row is Cy; and the color filter at an (8n+8)th row is Mg. In the even-numbered columns, the color filters at (8n+1)th, (8n+3)th and (8n+5)th rows are same and are Cy; those at (8n+2)th, (8n+4)th and (8n+6)th rows are same and are Mg; the color filter at an (8n+7)th row is Ye; and the color filter at an (8n+8)th row is G.

The image pickup device of the present variation 2, as in the second embodiment, can read the signal charges from predetermined rows in thinned-out manner, from the image pickup element 7, even if the image display unit 10 has a number of pixels in the vertical direction smaller than the number of pixels that can be outputted from the image pickup device 11 in a single image pickup operation. It is therefore possible to display the taken image in synchronization with the display speed of the image display unit 10 without utilizing an image memory or particular thinning-out means. It is also possible to form a color image signal, from the image signal read in thinned-out manner.

Also in the present variation 2, in any of the color filter arrangements shown in FIGS. 31 to 36, there is executed the addition of the signal charges of 4 pixels by combining a method of adding the signal charges of 2 pixels in the vertical direction and then adding the signal charges of 2 pixels in the diagonal direction, and a method of adding the signal charges of 2 pixels in the vertical direction and further adding the signal charges of 2 pixels in the vertical direction. It is thus possible to increase the level of the image signal, thereby enabling satisfactory image display even in an image pickup operation in a dark situation.

The image pickup device of the present invention allows to read the signal charges from predetermined rows of the image pickup element by thinning-out or by addition, even if the image display unit has a number of pixels in the vertical direction smaller than the number of pixels that can be outputted from the image pickup device 11 in a single image taking operation, and the image signal outputted from the image pickup element after thinning-out becomes a line-sequential color difference signal, so that the formation of a color image is rendered possible. It is therefore possible to dispense with the image memory or vertical thinning-out means for synchronizing the image pickup element with the image display unit, thereby achieving simplification of the circuit configuration, reduction of the magnitude of circuitry and reduction of the manufacturing cost.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup device comprising:
    a color filter array that includes color filters arranged in horizontal and vertical directions;
    and an image pickup element for picking up an image of an object through said color filter array, wherein
    said color filter array comprises color filter groups of a plurality of units, in which each unit comprises first to eighth color filter groups and each color filter group represents a column comprises an array of the color filters,
    the first color filter group comprises an alternate array of first and second color filters,
    the second color filter group comprises an alternate array of third and fourth color filters,
    the third color filter group comprises an alternate array of the second and first color filters,
    the fourth color filter group comprises an alternate array of the fourth and third color filters, the fifth color filter group is arranged in a same manner as the third color filter group, the sixth color filter group is arranged in a same manner as the second color filter group, the seventh color filter group is arranged in a same manner as the first color filter group, and the eighth color filter group is arranged in a same manner as the fourth color filter group.

2. An image pickup device according to claim 1, wherein the first to fourth color filters are of yellow, cyan, magenta and green.

3. An image pickup device according to claim 1, wherein said image pickup element includes the plurality of pixels arranged in the horizontal and vertical directions, respectively corresponding to the color filters, and signal charges of two predetermined pixels that are mutually adjacent in the vertical direction, among the plurality of pixels arranged corresponding to the color filters, are added and an image signal corresponding to the added signal charges is outputted from said output unit.

4. An image pickup device according to claim 3, wherein
the added signal charges of the two predetermined pixels are further added with signal charges of two predetermined pixels that are present in a direction diagonal to the first-mentioned two predetermined pixels in a column adjacent to that of the first-mentioned two predetermined pixels, and
an image signal corresponding to the added signal charges of the four predetermined pixels is outputted from said output unit.

5. An image pickup device according to claim 4, wherein an image signal corresponding to signal charges is outputted from said output unit by combining a method of adding the signal charges in the vertical direction and in the diagonal direction and a method of further adding, to the signal charges added in the vertical direction, signal charges in the vertical direction.

6. An image pickup device according to claim 3, wherein color filters corresponding to the two predetermined pixels are a combination of cyan and green and a combination of yellow and magenta, or a combination of yellow and green and a combination of cyan and magenta.

7. An image pickup device according to claim 4, wherein the color filters corresponding to the two predetermined pixels are a combination of cyan and green and a combination of yellow and magenta, or a combination of yellow and green and a combination of cyan and magenta.

8. An image pickup device according to claim 5, wherein the color filters corresponding to the two predetermined pixels are a combination of cyan and green and a combination of yellow and magenta, or a combination of yellow and green and a combination of cyan and magenta.

9. An image pickup device according to claim 1, further comprising:
a signal processing unit, which subjects the signals outputted from said output unit to an image processing; and
an image display unit, which displays image information from said signal processing unit.

* * * * *